US008296191B1

(12) United States Patent
Foo et al.

(10) Patent No.: US 8,296,191 B1
(45) Date of Patent: Oct. 23, 2012

(54) ELECTRONIC OPEN-MARKET COMMERCE SYSTEM AND METHOD

(75) Inventors: Elliot S. Foo, Rochester, NY (US); Stuart William Marsh, Fairport, NY (US); Anthony Cotroneo, Pittsford, NY (US); Thomas Vento, Rochester, NY (US)

(73) Assignee: STTE, LLC, Rochester, NY (US)

( * ) Notice: Subject to any disclaimer, the term of this patent is extended or adjusted under 35 U.S.C. 154(b) by 453 days.

(21) Appl. No.: 12/102,438

(22) Filed: Apr. 14, 2008

Related U.S. Application Data

(63) Continuation of application No. 11/971,881, filed on Jan. 9, 2008, now abandoned.

(60) Provisional application No. 60/884,390, filed on Jan. 10, 2007.

(51) Int. Cl.
*G06Q 40/00* (2012.01)

(52) U.S. Cl. ...................... 705/26.3; 705/26.1; 705/26.4

(58) Field of Classification Search ................. 705/26.1, 705/26.3, 26.4
See application file for complete search history.

(56) References Cited

U.S. PATENT DOCUMENTS

| | | | | |
|---|---|---|---|---|
| 5,940,812 | A | 8/1999 | Tengel et al. | |
| 6,385,594 | B1 | 5/2002 | Lebda et al. | |
| 7,065,509 | B2 * | 6/2006 | Arnold et al. | 705/76 |
| 7,194,442 | B1 * | 3/2007 | Flanagan et al. | 705/80 |
| 7,457,769 | B2 | 11/2008 | Goren et al. | |
| 7,523,060 | B1 * | 4/2009 | Tenorio | 705/37 |
| 7,778,882 | B2 | 8/2010 | Chatter et al. | |
| 7,899,734 | B2 | 3/2011 | Ausubel et al. | |
| 7,958,013 | B2 * | 6/2011 | Porat et al. | 705/26.3 |
| 2002/0040339 | A1 | 4/2002 | Dhar et al. | |
| 2002/0065762 | A1 * | 5/2002 | Lee et al. | 705/37 |
| 2002/0143692 | A1 | 10/2002 | Heimermann et al. | |
| 2003/0036993 | A1 | 2/2003 | Parthasarathy | |
| 2004/0083156 | A1 | 4/2004 | Schulze | |
| 2004/0098315 | A1 * | 5/2004 | Haynes et al. | 705/26 |
| 2004/0133256 | A1 | 7/2004 | Callister | |
| 2005/0119966 | A1 | 6/2005 | Sandholm et al. | |
| 2005/0234798 | A1 | 10/2005 | Du Preez et al. | |

(Continued)

FOREIGN PATENT DOCUMENTS

WO WO 00/75833 A2 12/2000

OTHER PUBLICATIONS

"How to Bid on An Auction," eHow.com, accessed at http://www.ehow,cin/how_2742_bid-auction.html, accessed on Aug. 21, 2004.

(Continued)

*Primary Examiner* — Jagdish Patel
(74) *Attorney, Agent, or Firm* — Sterne, Kessler, Goldstein & Fox P.L.L.C.

(57) ABSTRACT

A computer implemented method for administering a sales transaction, including: receiving consumer transaction requirements and seller transaction requirements within one or more established transaction parameters; filtering the consumer transaction requirements based on the seller transaction requirements and producing a subset of consumer transaction requirements based on the filtering; receiving bids from potential sellers, wherein the bids are limited to a predefined number and type of variables; displaying the bids to potential sellers and receiving subsequent bids; displaying a plurality of the bids and the identities of the potential sellers that correspond to the displayed bids to one or more potential consumers; and receiving from the one or more potential consumers an acceptance or rejection of one or more of the displayed bids.

6 Claims, 34 Drawing Sheets

U.S. PATENT DOCUMENTS

| | | | | |
|---|---|---|---|---|
| 2005/0240507 | A1 | 10/2005 | Galen et al. | |
| 2005/0273406 | A1 | 12/2005 | Lebda et al. | |
| 2006/0041500 | A1 * | 2/2006 | Diana et al. | 705/37 |
| 2006/0059062 | A1 * | 3/2006 | Wood et al. | 705/35 |
| 2006/0069635 | A1 * | 3/2006 | Ram et al. | 705/37 |
| 2006/0136324 | A1 | 6/2006 | Barry et al. | |
| 2006/0149653 | A1 | 7/2006 | Davis et al. | |
| 2006/0149664 | A1 | 7/2006 | Smyth et al. | |
| 2006/0173773 | A1 * | 8/2006 | Ettinger, Jr. | 705/37 |
| 2006/0184447 | A1 * | 8/2006 | Nieboer et al. | 705/37 |
| 2006/0253366 | A1 | 11/2006 | Rebibo | |
| 2007/0050284 | A1 | 3/2007 | Freeman | |
| 2007/0073591 | A1 * | 3/2007 | Perry et al. | 705/26 |
| 2007/0073592 | A1 * | 3/2007 | Perry et al. | 705/26 |
| 2007/0185777 | A1 * | 8/2007 | Pyle et al. | 705/26 |
| 2007/0208630 | A1 * | 9/2007 | Chatter et al. | 705/26 |
| 2008/0046332 | A1 * | 2/2008 | Rotholtz | 705/26 |
| 2008/0109349 | A1 | 5/2008 | Jenich et al. | |
| 2009/0043685 | A1 | 2/2009 | Benjamin et al. | |

OTHER PUBLICATIONS

Kenny, C., "How Online Auctions Work," CNN.com, accessed at http://archives.cnn.com/2000/TECH/computing/07/14/auction.tutorial.idg/index.html, accessed on Jul. 14, 2000.

Prince, D., "Auction This! Your Complete Guide to the World of Online Auctions," pp. 116-131, Prima Tech Publishing, United States (1999).

Taylor, D., "How Do I Figure Out What Something's Worth on Ebay?" accessed at http://www.askdavetaylor.com/what_is_something_worth_on_ebay.html, accessed on Oct. 18, 2006.

The Wikipedia Entry on Auctions, accessed at http://en.wikipedia.org/wiki/Auction, accessed on Jan. 8, 2004.

U.S. Appl. No. 12/102,447 , entitled "Electronic Open-Market Commerce system and Method," inventors Foo et al., filed Apr. 14, 2008.

U.S. Appl. No. 12/205,714, entitled "Electronic Open-Market Commerce system and Method," inventors Foo et al., filed Sep. 5, 2008.

* cited by examiner

☆ Note: Both the Multiple Identical Low Bidder branch and the Single Lowest Bidder branch of this flow chart show three (3) opportunities for selecting a lender based on rate and brand preference, the actual number of choices will be a function of the number of bidders.

☆ Note: Both the Multiple Identical Low Bidder branch and the Single Lowest Bidder branch of this flow chart show three (3) opportunities for selecting a lender based on rate and brand preference, the actual number of choices will be a function of the number of bidders.

☆ Note: Both the Multiple Identical Low Bidder branch and the Single Lowest Bidder branch of this flow chart show three (3) opportunities for selecting a lender based on rate and brand preference, the actual number of choices will be a function of the number of bidders.

ELECTRONIC OPEN-MARKET COMMERCE SYSTEM AND METHOD

CROSS REFERENCE TO RELATED APPLICATIONS

This application is a continuation of U.S. application Ser. No. 11/971,881, filed, Jan. 9, 2008 now abandoned, which claims the benefit of U.S. Provisional Application No. 60/884,390, filed Jan. 10, 2007, which are incorporated herein by reference in their entireties.

BACKGROUND OF THE INVENTION

1. Field of the Invention

The present invention is directed to electronic commerce and more particularly to a method and system for the purchase of a tangible or intangible product over an electronic network.

2. Background Art

With the expansion of the Internet has come expansion of web based commercial sites into virtually all areas of business and commerce. This expansion includes the areas of consumer and commercial lending by banks, mortgage brokers, and other financial institutions. These web sites are typically devoted to transactions conducted with a single institution, such as a bank. Transactions may include making transfers between accounts, making bill payments, and completing loan applications. However, typically, transactions conducted at one site are restricted to matters associated specifically with the institution or organization controlling the web site.

The problem of individual web sites offering only their own products is found with the sale of almost all tangible products, such as automobiles, appliances, etc. and almost all intangible products, such as loans, certificates of deposit, insurance policies, etc. (For the purpose of this discussion, a "seller" is defined as an individual or an entity which makes available a tangible or intangible product to a purchaser, borrower, or investor in exchange for consideration.) A prospective purchaser, borrower, or investor (collectively "consumer") cannot compare prices for a tangible or intangible product without incurring significant search costs by accessing multiple web sites. This problem is exacerbated when the total cost of purchasing a product includes items in addition to a stated price, such as the cost of delivery for a tangible product or loan points or other closing costs for an intangible product. These additional variables increase complexity, reducing and possibly eliminating the consumer's ability to make an accurate comparison.

An example of this is a residential mortgage which includes several variables, such as type of loan (fixed rate, adjustable rate etc.), term of loan, amount of down payment, and closing costs (such as title insurance, property insurance, appraisal fees, credit reports, etc.). In addition, the fees for and types of closing costs are likely not consistent among lending institutions. This creates a situation in which it becomes difficult, if not impossible, for a consumer to accurately evaluate and compare loan offers from competing lenders, i.e. an "apples to apples" comparison.

Recently, attempts to address this single web site dilemma have been made by the introduction of shopping web sites which display multiple sellers' products and prices and receive compensation for transferring consumers to the seller's web site. These shopping web sites are, in practicality, merely an advertising medium. The consumer visits the shopping web site and, if interested, selects a desired product and is then transferred to that seller's web-site. At this point the shopping web site is no longer part of the transaction. The shopping web site process may reduce, but does not eliminate, the search costs incurred by the consumer. Additionally, as with the single web-site process, the shopping web site process is static: the consumer must still search many sellers and can only view static prices.

What is needed, therefore, are methods and systems to overcome the above-mentioned deficiencies.

BRIEF SUMMARY OF THE INVENTION

In an embodiment a method for the purchase of a tangible or intangible product comprises enabling a consumer to submit at least one transaction requirement within at least one established transaction parameter, such as to an electronic open-market commerce company. The method further comprises storing the submitted transaction requirement(s), for example, so as to be later retrieved on a data web page; enabling potential sellers to submit at least one seller transaction requirement within the at least one established transaction parameter; comparing the consumer's transaction requirement(s) to the seller's or sellers' transaction requirement(s); receiving one or more transaction bids by at least one potential seller, where a bid is comprised of a defined number and type of variables. The method also comprises displaying the one or more transaction bids to one or more of the potential sellers and enabling one or more potential sellers to submit a transaction bid or a subsequent transaction bid. The method also comprises, displaying one or more of the transaction bids to the consumer (e.g. via a bid display web page of the web site) and enabling the consumer to select an acceptable bid from one of the bids.

In an embodiment, a consumer may access the web site through a public web page. A consumer may also be enabled to select the type of transaction via the public web page.

The data web page for the website may be publicly accessible or privately accessible. In one embodiment, the data web page is secure. In an embodiment, the consumer name and address may or may not be accessible to the potential sellers.

In an embodiment, the transaction requirements may be compared or filtered by the potential seller wherein the filtering comprises comparing the consumer's transaction requirement(s) to the seller's transaction requirement(s) within at least one established parameter. The at least one seller's transaction requirement may be altered at potential seller's discretion.

In an embodiment, the method further comprises the potential seller(s) tendering a transaction bid. In an embodiment, the method allows the potential sellers to tender one or more subsequent bids.

In an embodiment, one or more of the transaction bids are displayed to the consumer via the bid display web page of the web site and to one or more of the potential sellers. The transaction bids are displayed in as close to real time as possible to the consumer and to one or more of the potential sellers.

The bid display web page accessed by the consumer and the bid display web page accessed by the potential seller may be the same page. Alternatively, the bid display web page accessed by the consumer and the bid display web page accessed by the potential seller may be separate bid display web pages. The bid display web page may be publicly accessible or privately accessible. In one embodiment the bid display web page is secure.

In an embodiment, the bid display page and the data web page may be the same page.

The method further comprises repeating the above bidding steps until the process is terminated after a pre-determined duration or after at least one acceptable bid has been tendered.

The consumer can select an acceptable bid from one of the at least one said bids.

The company may also confirm the selection of the acceptable bid. The consumer may refuse to accept any of the at least one transaction bids.

In an embodiment, an agent may be selected to perform transaction consummation services. The agent may be the selected potential seller. The agent may be the company. The agent may be an independent third party.

In an embodiment, the progress and status of the selected transaction may be tracked.

The transaction may be for the sale of an intangible product. The intangible product may be a loan. The loan may be a real estate loan, a subordinate real estate loan, a line of credit, a vehicle loan, or another type of loan. The price for these intangible products may be an interest rate, and/or loan points, and/or fees. In an embodiment, the intangible product may be an insurance policy. The insurance policy may be a homeowner's insurance policy, a vehicle insurance policy, a life insurance policy, or a title insurance policy. The price for an insurance policy is the premium. In an embodiment, the intangible product may be an investment product. The investment product may be a certificate of deposit. The price for an investment product may be an interest rate. The transaction may be for the sale of a tangible product. The tangible product may be an appliance, a vehicle, or a watercraft. The price of a tangible product may be the acquisition cost of the product.

In an embodiment, the tendering of the transaction bid(s) may be automatic. The tendering of subsequent transaction bid(s) may be automatic. Alternatively, tendering of the transaction bid(s) may be manual and tendering of subsequent transaction bid(s) may be manual. Alternatively, the tendering of bids and/or subsequent bids may be a combination of automatic and manual methods.

A system for the purchase of tangible or intangible products is also provided. The system comprises a consumer transaction requirement input medium where a consumer inputs transaction requirements. The consumer transaction requirement input medium may be a public access web page. The consumer transaction requirement input medium may be e-mail. The consumer transaction requirement input medium may include a telephone connection with the system. The consumer transaction requirement input medium may comprise in-person communication; wherein in-person communication may be telephonic or face-to-face communication. The system also comprises storing these transaction requirements in an electronic database.

The system also comprises a web page, where at least one potential seller is provided access to stored consumer transaction requirements. The system further comprises at least one filter, the filter being linked to the web page to enable each of the potential sellers to input or select transaction requirements within established parameters to compare or filter against the transaction requirements submitted by the consumer. The system further enables at least one potential seller to tender at least one bid for the transaction.

In an embodiment, at least one of the filters is supplied by one or more of the potential sellers. In another embodiment, at least one of the filters is supplied by the company. In another embodiment, at least one of the filters is supplied by a third party provider.

The system also comprises a bid display page to display to the consumer and potential seller(s) some or all of the at least one potential seller's bid or bids. The consumer may select one or more bid or bids from the one or more bids displayed on the display page. In one embodiment, the system further comprises a separate consumer bid display page and a separate potential seller bid display page. In another embodiment, the bid display page is accessible only to the consumer. In an alternate embodiment, the bid display page is accessible only to at least one potential seller.

The at least one potential seller can submit one or more bids to the private access web page. The private access web page and the bid display page may be the same web page.

It is to be appreciated that some or all of the elements of the system may be located at separate facilities.

BRIEF DESCRIPTION OF THE DRAWINGS/FIGURES

DETAILED DESCRIPTION OF THE INVENTION

Figure 1A:
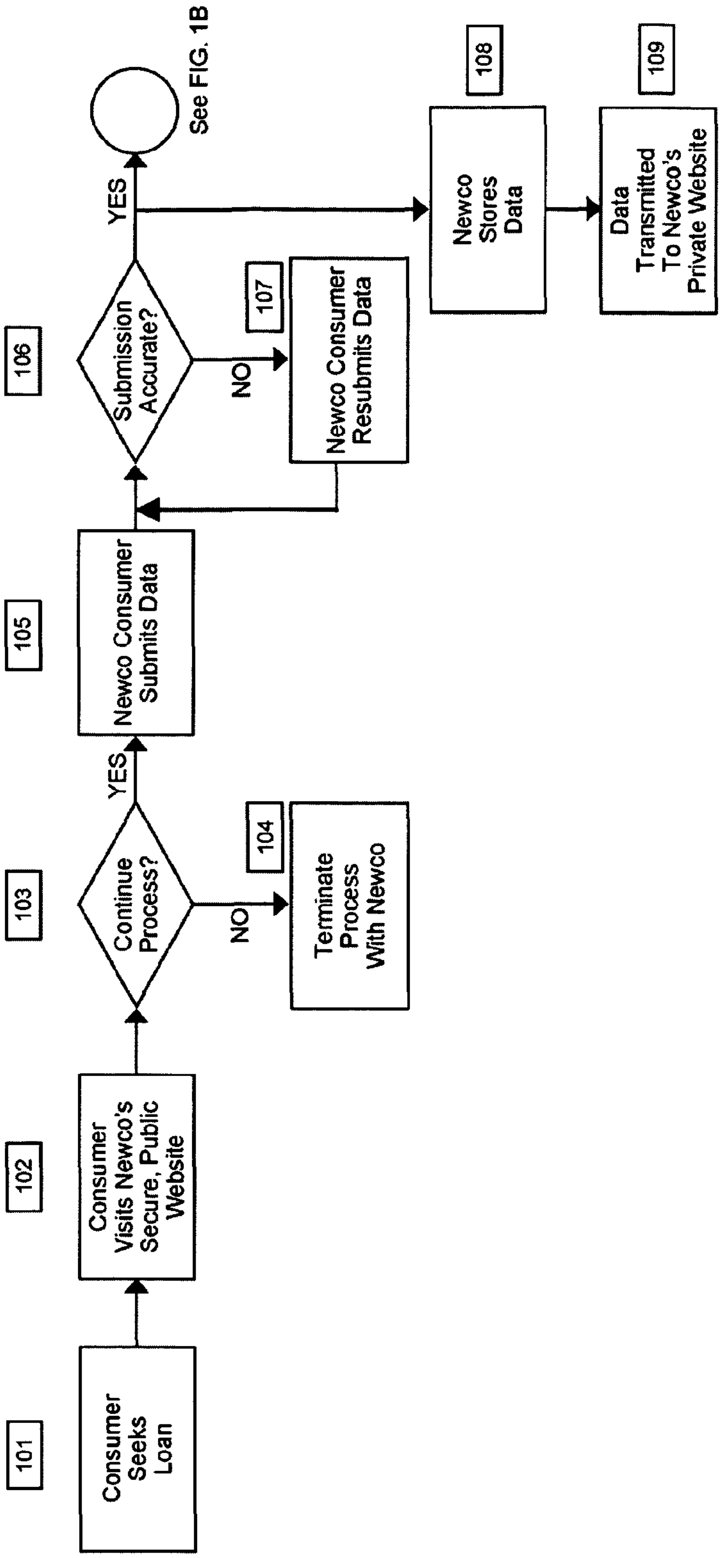
FIG. 1 (FIGS. 1A-1F) is a flow diagram depicting the steps of the method performed by a mortgage loan consumer wishing to access the method and system of the present invention.
Figure 1B:
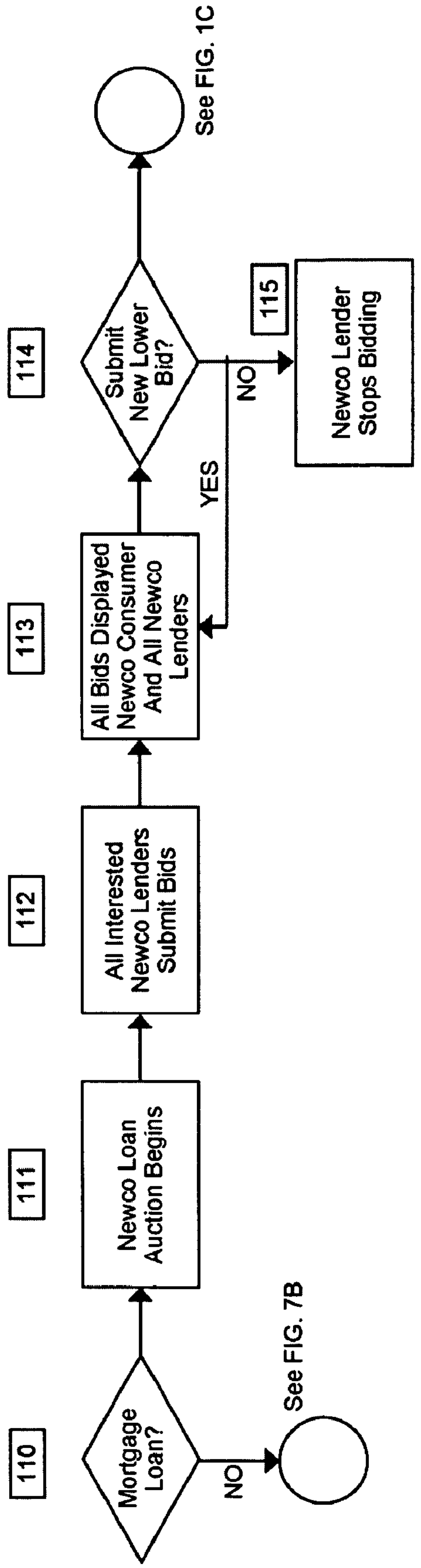
Figure 1C:
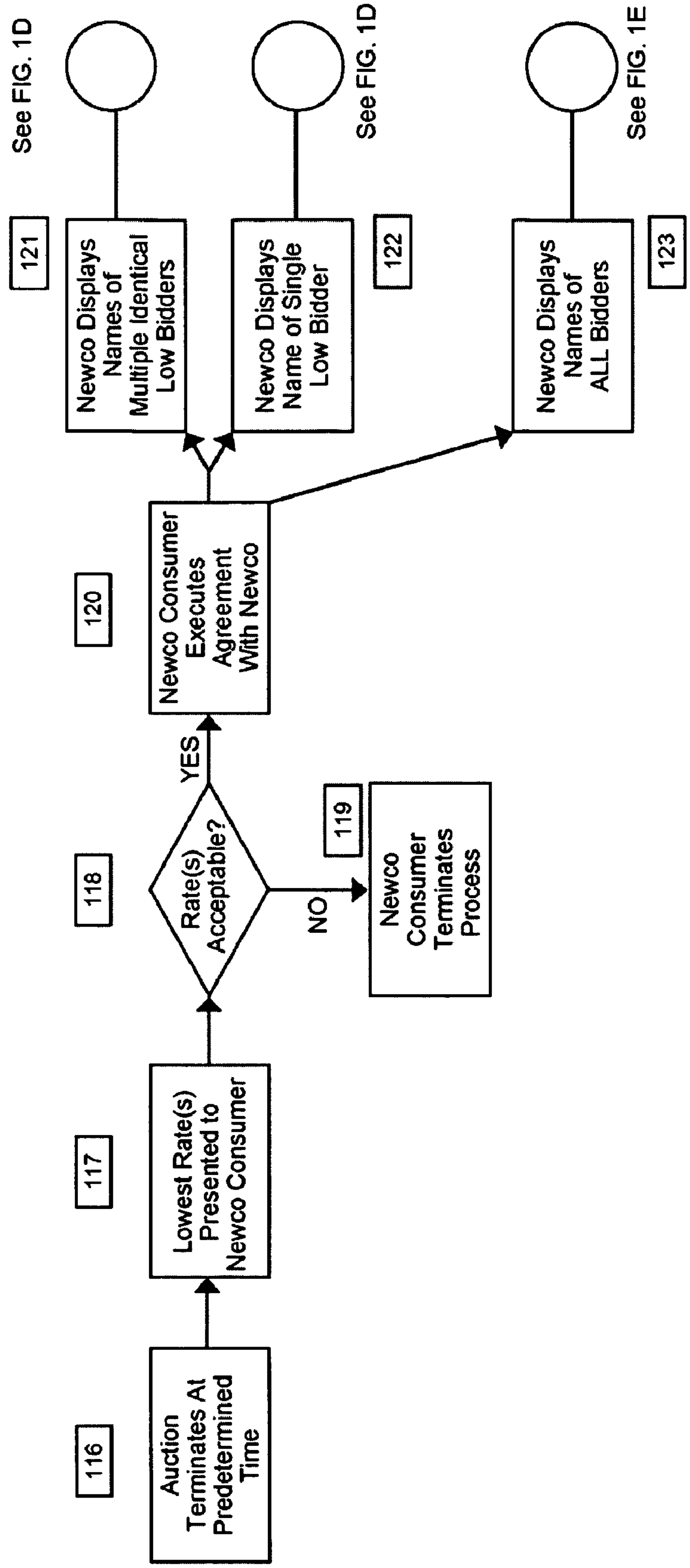

As compared to conventional single web site and shopping web site processes, the present invention allows many potential sellers to interact with one consumer in an electronic version of an open-market, resulting in reduced search costs for the consumer, reduced prices paid by the consumer, and reduced consumer acquisition costs incurred by the seller. This open-market not only allows sellers to interact with a consumer, but also allows other sellers to observe, and, if desired, participate in this interaction.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

In one embodiment, disclosed herein is a method and system for allowing a consumer to submit his or her desire for a product or products (tangible and/or intangible) having particular features, along with relevant personal information (collectively the "transaction requirements"). These transaction requirements can then be accessed by the universe of sellers ("potential sellers") who sell tangible and/or intangible products. The method further allows potential sellers to submit transaction requirements within established parameters to compare against the transaction requirements submitted by the consumer. Potential seller(s) who can meet the consumer's transaction requirements and choose to respond, do so by tendering one or more competitive bids. A bid consists of a defined number and type of variables, including but not limited to a "price" or "prices". (The "price" for a tangible product, such as an appliance or an automobile is the acquisition cost. The "price" for an intangible product, such as a loan or a certificate of deposit, is an interest rate, and the "price" of an insurance policy is the premium.) These bids, with their defined number and type of variables, along with the defined processing requirements, enable a consumer to make an accurate comparison prior to making a purchase. This standardized bidding process, along with the defined processing requirements, also enables potential sellers to accurately compare bids and, if desired, respond by submitting a subsequent bid or bids.

According to one embodiment of the present invention, a method and system is established in which a consumer submits transaction requirements within established parameters, preferably through a standardized product-specific transaction application and more preferably through an internet connection. The transaction requirements submitted by one or more consumers can be accessed by the universe of potential sellers, preferably through an internet based data web page. Potential sellers input or select transaction requirements within established parameters. Potential sellers then compare or filter their transaction requirements against the transaction requirements submitted by the consumer(s). One, or preferably a plurality, of potential sellers who can meet the requirements and choose to respond, do so by tendering one or more competing bids ("bidding"). Potential sellers that tender one or more bids are referred to as "bidders". Preferably, participating potential sellers complete an approval process in order to be approved to submit bids on transactions and fulfill defined processing requirements. A bid consists of a defined number and type of variables, including but not limited to a price. These bid(s) are then presented to the consumer, preferably on a display page through an internet connection (the "bid display web page"). Potential sellers may then submit one or more subsequent bids in response to competitive bids.

In this document, the term "company" refers to the entity operating this method and system. The company may host the web-site. Alternatively, other types of entities may provide web site hosting services to the company. In the figures discussed below, the term "Newco" is used to designate the company.

The company may also be a processing company which facilitates the sale of tangible and intangible products by providing processing requirements, including but not limited to delivery, escrow services, loan closing services, title insurance, credit reports, etc. Alternatively, the company may provide processing requirements through a third-party. Alternatively, the seller may provide processing requirements.

In the method and system described below, the primary embodiment illustrated is for a mortgage loan. However, as stated above and explained below, the method and system may be used for tangible products, such as automobiles, appliances, etc. and intangible products, such as loans, certificates of deposit, insurance policies, real estate loans, subordinate real estate loans, lines of credit, commercial loans, etc.

FIG. 1 (FIGS. 1A-1F) is a flow diagram depicting the steps of the method performed by a consumer wishing to access the method and system of the present invention. FIG. 2 (FIGS. 2A-2C) is a flow diagram depicting the steps of the method that are performed by a lender wishing to access the method and system of the present invention. Both FIGS. 1 and 2 also include steps performed by the company operating the method and system.

As shown in FIG. 1 (FIGS. 1A-1F), in step 101, a consumer enters the market for loan to purchase a home, refinance an existing home mortgage loan, obtain a Home Equity Loan or Line of Credit, an automobile loan, a boat loan, or any other form of a consumer-based loan.

In step 102, the consumer visits Newco's secure, public Web-Site on the World Wide Web through an Internet connection.

The company web site preferably includes 1) public web pages ("public page" or "public pages"), 2) private, secure web pages accessible only by consumers registered with the system ("consumer page" or "consumer pages"), and 3) private, secure web pages accessible only by lenders approved by the system ("lender page" or "lender pages"). In a preferred embodiment, after accessing the public web page the consumer may establish a private account secured by a password or other means of protection known to those skilled in the art. Methods and software for creating and later accessing private accounts from public pages are well known to those having skill in the art. Preferably, encryption methods are used to protect the confidentiality of the information transmitted between the consumer, the company, and lenders.

In step 103, the consumer reviews all pertinent data published on the web-site regarding method of operations and costs and decides whether to continue with the Newco loan process.

In step 104, if the consumer determines the Newco loan process does not meet his needs, the consumer terminates the process without cost or obligation.

If the consumer determines the Newco loan process does meet his needs, the consumer continues with the Newco loan application process. From this point forward the loan applicant is referred to as "Newco Consumer."

In step 105, Newco Consumer submits one or more transaction requirements in one or more established transaction parameters. In the case of a loan, these transaction requirements are referred to as "borrower loan requirements" and include, but are not limited to, name, address, employment history, income, outstanding debt obligations, and desired loan terms, such as loan amount, type of loan (fixed term, ARM, balloon payment), length of loan, down payment, etc. For example, Newco Consumer may submit the following loan application data via the internet through a password-protected, secure, private connection: (1) the type of loan desired and amount of loan points to pay, if any; (2) the desired term (in years) of the loan; (3) personal credit information; and (4) other relevant personal information and applicable collateral information which will be used by prospective lenders to evaluate the creditworthiness of the loan applicant and therefore be fully prepared to submit an accurate offer to provide the loan financing. In a preferred embodiment, Newco Consumer's name will not be disclosed to prospective lenders. Only the zip code of Newco Consumer's address is disclosed. If necessary, the method and system will determine the consumer's ability to qualify for his or her desired loan terms based upon the consumer's submitted transaction requirements.

Newco Consumer is also prompted to select an auction period within a set of established parameters. The Newco Loan Auction will automatically commence and terminate at the selected times.

In step 106, Newco Consumer completes the loan application. Newco Consumer attests that the data being submitted is accurate and correct and holds Newco and the Lender harmless in the event the data submitted is inaccurate. The Newco web-site verifies accuracy and completeness of the application.

If Newco computer reviews the data and determines an error has been made, in step 107, Newco Consumer is prompted to correct the submission.

After Newco Consumer submits accurate and correct data, in step 108, Newco stores the submitted loan application data in the company's system ("system"). In an alternate embodiment, the system may be hosted on an off-site computer by a third-party, such as on a server farm. Such systems are well known to those skilled in the art.

In step 109 Newco Consumer's loan application data is transmitted to Newco's private web-site, which may only be accessed by approved lenders who have been authorized to submit loan financing offers to Newco Consumers. From this point forward these approved lenders are referred to as "Newco Lenders."

In step 110, a Newco computer determines the type of loan sought by Newco Consumer. If it is determined to be a loan other than a consumer mortgage, then the process in the Newco Consumer Non-Mortgage Loan flow chart (as discussed below with respect to FIG. 7 (FIGS. 7A-7F)) is followed. If it is determined to be a consumer mortgage, the process in this flow chart is followed.

As discussed below with respect to FIG. 2 (FIGS. 2A-2C), approved Newco Lenders may sort or filter pending Newco loan applications and determine which applications to bid on and which applications to not bid on. This filtering process is discussed in more detail below. Filters are microcontroller-based programs that automatically compare a consumer's loan application data to a lender's transaction requirements. The transaction requirements may include, but are not limited to, personal income, property address (preferably based on zip code), credit rating, and offered loan terms, such as loan amount, type of loan (fixed term, ARM, balloon payment), length of loan, down payment, etc, and other transaction requirements considered relevant to the approved lending entities. The filter may be used by potential lenders to automatically remove or screen consumers whose loan application data are not of interest to the potential lenders. The filter may also be used by potential lenders to consider only those consumers whose loan application data are of interest to the potential lender. In an alternate embodiment, the name and address(es) of the consumer is not revealed to the potential lender. Persons of skill in the art will recognize that transaction requirements and parameters may be changed to reflect changes in lenders' loan policies.

In step 111, at the time predetermined by Newco Consumer, the Newco Loan Auction begins.

In step 112, all Newco Lenders interested in providing loan financing to this particular Newco Consumer submit their first bid. In a preferred embodiment, the bid will contain one or more defined variables, such as an interest rate and/or loan points or other loan costs. In a more preferred embodiment, the bid will contain one variable, such as interest rate. Persons of skill in the art will recognize that during the bidding process some or all of the loan application data and the defined bid variables may not be disclosed and other loan application data and the defined bid variables may be disclosed. In a preferred embodiment, during the bidding process the identities of the consumer and potential lenders are not disclosed to each other.

In step 113, using Web 2.0 related technologies, all bids submitted by all Newco Lenders are displayed confidentially to the Newco Consumer on the password-protected, secure portion of the public web-site. The bids are displayed in as close to real time as technologically possible. This Loan Auction is displayed only to this particular Newco Consumer and not all Newco Consumers currently conducting their own Newco Loan Auctions. In one embodiment, bids are displayed to the consumer and to all approved lenders. In an alternate embodiment, some or all of the bids may be displayed to the consumer and to all approved and potential lenders. In another alternate embodiment, some or all of the bids may be displayed to the consumer and to interested lenders, which are lenders whose transaction requirements match the consumer's loan application data but have not yet submitted a bid. In another alternate embodiment, some or all of the bids may be displayed to the consumer and to one or more bidding lenders. In another alternate embodiment, some or all of the bids may be displayed only to the consumer. The consumer accesses the bids through the consumer page and the lender accesses the bids through the lender page. In an alternate embodiment, the lender accesses the bids through the public web page or web pages. In another alternate embodiment, the consumer and the lender access bids through a common web page or web pages. Preferably, the bids are displayed after the bids are submitted in as close to real time as possible.

As the Newco Lenders' bids are displayed to the Newco Consumer on his web-site, all of the Newco Lenders' bids will be simultaneously displayed in as close to real time as technologically possible to all bidding Newco Lenders. The Newco Loan Auction process will trigger competition as a result of the full disclosure of competitive bids.

In step 114, after reviewing competing loan bids, each Newco Lender participating in a particular Newco Loan Auction will decide whether to submit a new, lower bid. All Newco Lenders interested in submitting a new, lower bid may then submit a new, lower bid, which, in turn, is displayed to the Newco Consumer and all bidding Newco Lenders. Newco Lender may also decide not to submit a new lower bid and, in step 115, stop bidding. The bidding process continues until the end of the auction at the time predetermined by Newco Consumer. The offering of both first and subsequent bids may be done automatically by a computer or manually by an operator observing the progress of the process.

In an embodiment, the Newco Loan Auction terminates at a pre-determined time and the consumer decides which of the bids, if any, to accept. All final bids must be submitted prior to the auction termination. Step 116 in FIGS. 1 and 2 depicts a termination step. The termination step is preferably activated by reaching a predetermined time limit. Alternatively, the termination step is activated by accepting any of the first or subsequent bids by the consumer or other predetermined termination criteria. In another embodiment, the consumer may terminate the auction at any time prior to the pre-determined termination of the auction by accepting a bid. In yet another embodiment, a consumer may terminate the bidding process prior to the pre-determined termination of the auction by selecting a fixed pre-determined price. The fixed pre-determined price may be determined prior to the start of the auction by the company or by one of the potential lenders. Alternatively, the fixed pre-determined price may be determined during the auction by the company or by one of the potential lenders.

In step 117, the lowest loan rate or rates and loan costs (points), if applicable, are displayed to the Newco Consumer. The name or names of the bidders are NOT displayed to the Newco Consumer.

In step 118, Newco Consumer decides whether the lowest rate or rates and loan costs, if applicable, presented are acceptable. If Newco Consumer determines that the rate or rates and loan costs, if applicable, presented are unacceptable, Newco Consumer can terminate the process in step 119. Alternatively, if Newco Consumer determines that the rate or rates and loan points, if applicable, presented are acceptable, in step 120, Newco Consumer may execute an agreement with Newco. Newco Consumer executes an agreement electronically to have Newco or the wining lender procure all loan services on the consumer's behalf. Newco Consumer pays Newco a fee via a credit card over the internet.

In step 121, once Newco Consumer has executed the agreement and paid the fee, Newco displays the names of the multiple, identical low bidders. Alternatively, in step 122, once Newco Consumer has executed the agreement and paid the fee, Newco displays the name of the single low bidder. In another alternative embodiment, in step 123, once Newco Consumer has executed the agreement and paid the fee, Newco displays the names of all bidders.

Figure 1D:
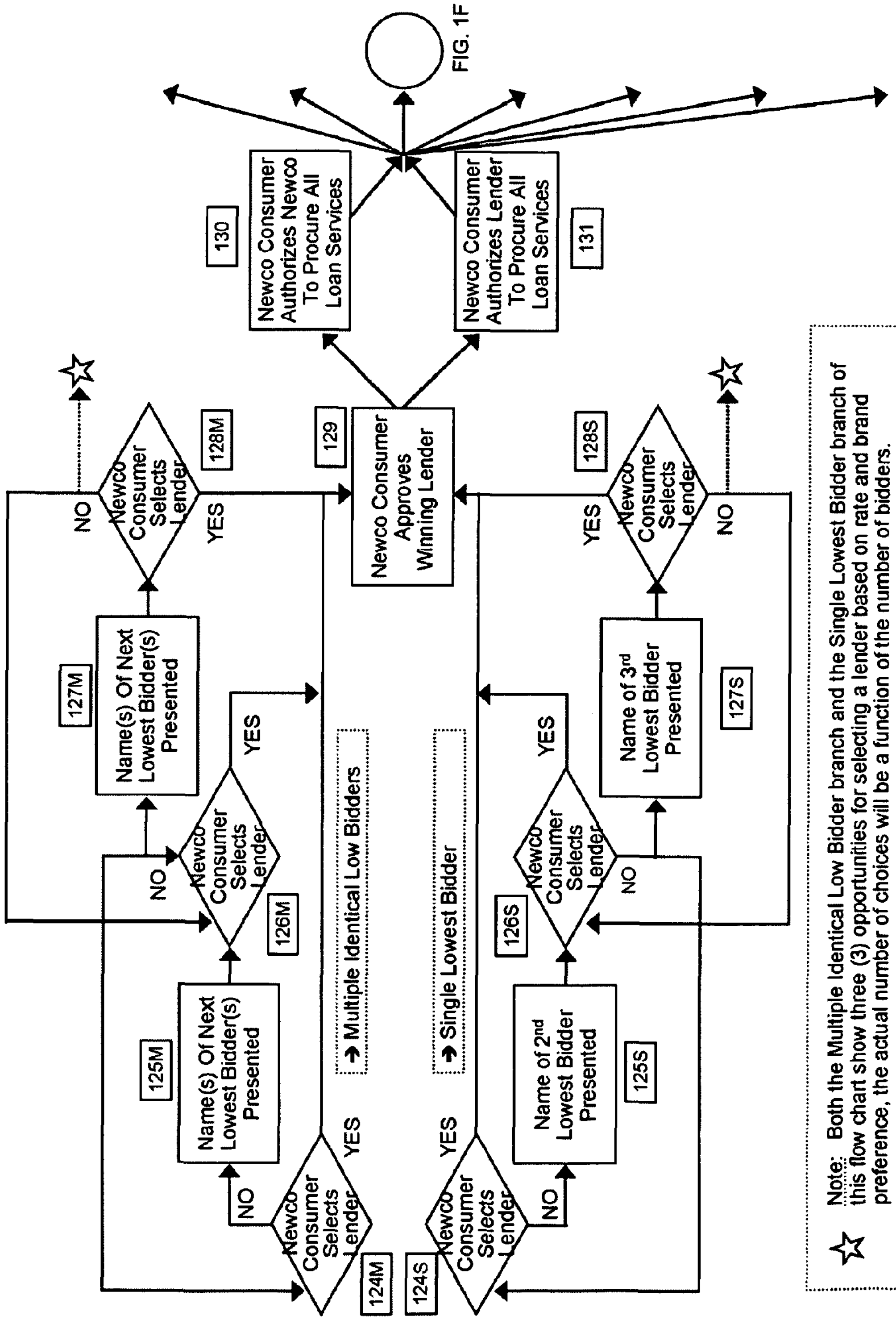
Figure 2A:
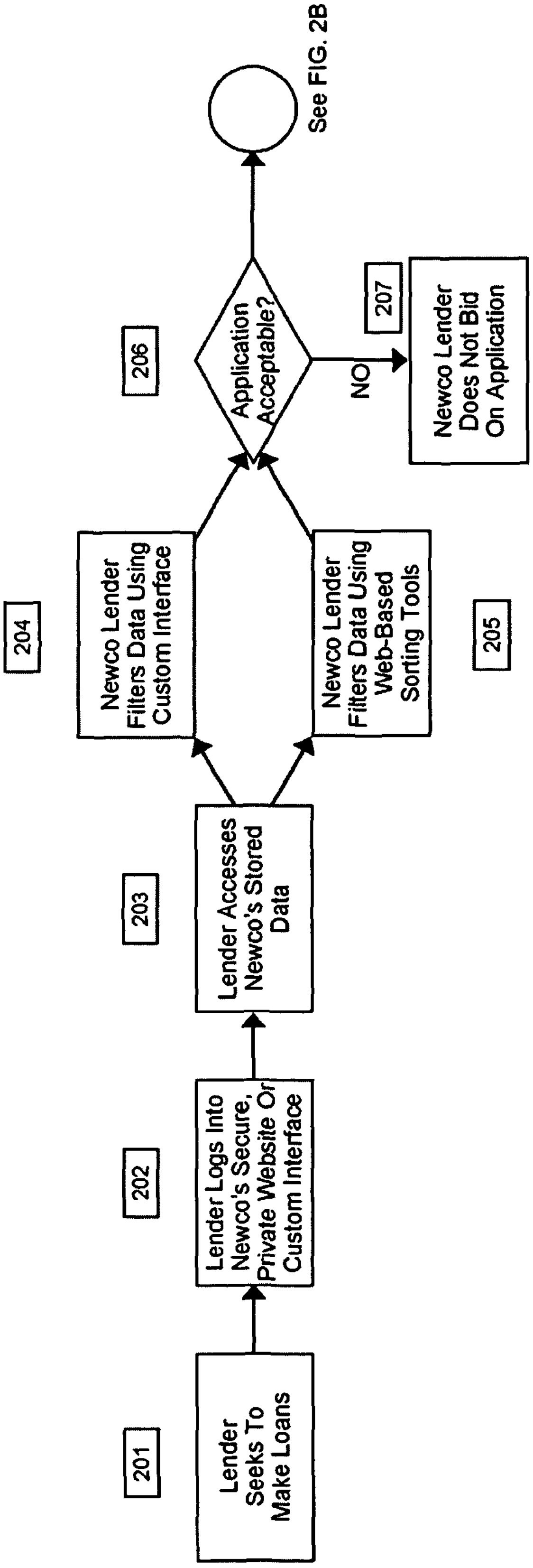
FIG. 2 (FIGS. 2A-2C) is a flow diagram depicting the steps of the method that are performed by a lender wishing to access the method and system of the present invention.
Figure 2B:
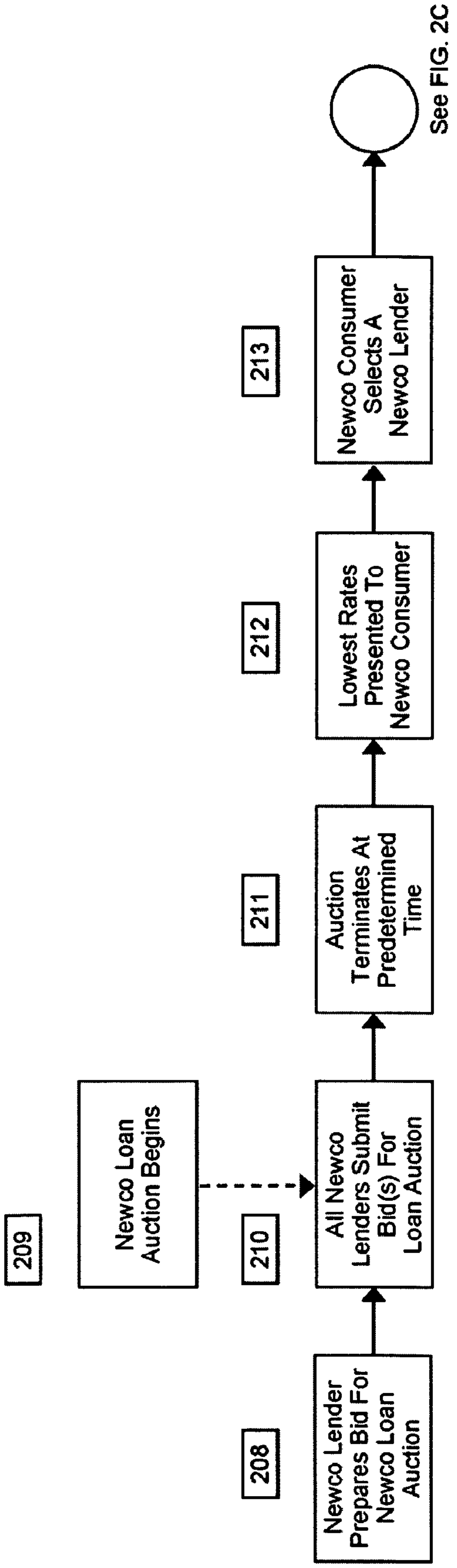
Figure 2C:
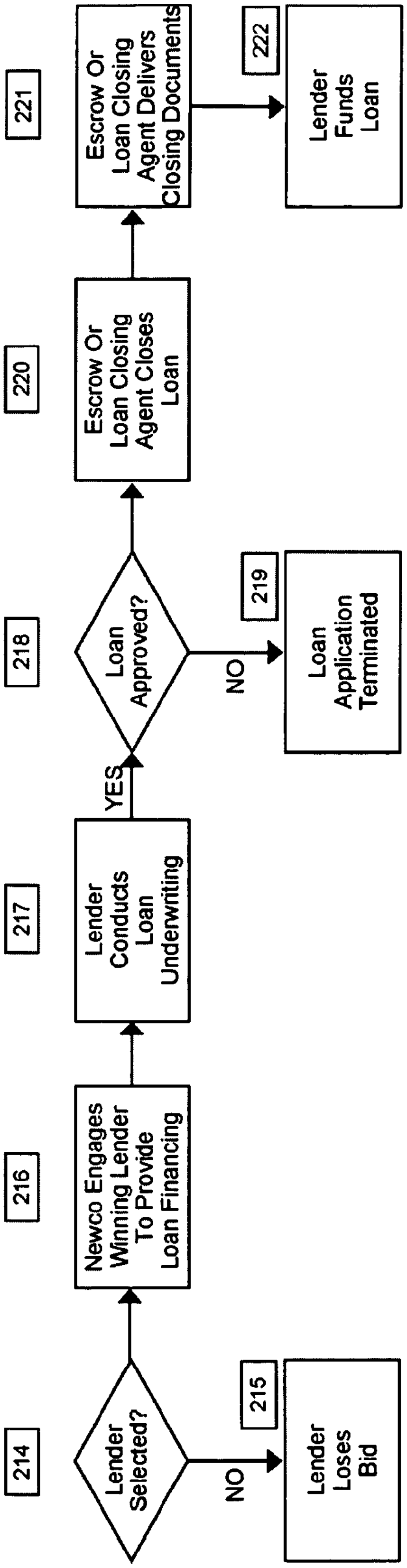

In a preferred embodiment, in Steps 124M through 128M in FIG. 1D, the identities of multiple identical low bidders are presented.

In step 124M, if there are multiple identical lowest bidders, then Newco Consumer evaluates the names of the low bidders and decides which one to accept based upon any brand loyalties or brand aversions. Newco Consumer may select one of the multiple identical lowest bidders, or, if the lowest bidders are unacceptable to Newco Consumer, Newco may give Newco Consumer the option to view the name(s) of the next lowest bidder(s).

In step 125M, the name(s) of the next lowest bidder(s) are presented to Newco Consumer.

In step 126M, Newco Consumer evaluates the next lowest bidder(s) and determines if the bidder(s) is/are acceptable based upon any brand loyalty or brand aversion. Newco Consumer may select one of the next lowers bidder(s), or, if the next lowest bidder(s) are unacceptable to Newco Consumer, Newco may give Newco Consumer the option to view the names of the next lowest bidder(s), or, Newco may give Newco Consumer the option to return to any of the previously displayed bidders.

In step 127M, the name(s) of the next lowest bidder(s) are presented to Newco Consumer.

In step 128M, Newco Consumer evaluates the next lowest bidder(s) and determines if the bidder(s) is/are acceptable based upon any brand loyalty or brand aversion. Newco Consumer may select a bidder, or, if the next lowest bidder(s) are unacceptable to Newco Consumer, Newco may give Newco Consumer the option to view the names of the next lowest bidder(s), or, Newco may give Newco Consumer the option to return to any of the previously displayed bidders.

It will be recognized that these steps may be repeated presenting subsequent bid(s) until the consumer selects a bidder. In each instance, the consumer may select a previously displayed bid which the consumer originally rejected.

In an alternate embodiment, in Steps 124S through 128S in FIG. 1D, the identity of the single low bidder is presented.

In step 124S, if there is one single lowest bid, the Newco Consumer evaluates the lowest bidder and determines if that lowest bidder is acceptable based upon any brand loyalty or brand aversion. Newco Consumer may select the lowest bidder or, if the single lowest bidder is unacceptable to Newco Consumer, Newco may give Newco Consumer the option to view the name of the 2nd lowest bidder.

In step 125S, the name of the 2nd lowest bidder presented to Newco Consumer. In step 126S, Newco Consumer evaluates the 2nd lowest bidder and determines if this bidder is acceptable based upon any brand loyalty or brand aversion. Newco Consumer may select the 2nd lowest bidder, or, if the 2nd lowest bidder unacceptable to the Newco Consumer, Newco may give Newco Consumer option to view name of 3rd lowest bidder, or, Newco may give Newco Consumer the option to return to the 1st lowest bidder.

In step 127S, the name of the 3rd lowest bidder is presented to Newco Consumer.

In step 128S Newco Consumer evaluates the 3rd lowest bidder and determines if this bidder is acceptable based upon any brand loyalty or brand aversion. Newco Consumer may select the 3rd lowest bidder, or if the 3rd lowest bidder is unacceptable to Newco Consumer, Newco may give Newco Consumer the option to view the name of the 4th lowest bidder (and cycle repeats through 5th, 6th, etc lowest bidder), or, Newco may give Newco Consumer the option to return to the 2nd lowest or 1st lowest bidder.

It will be recognized that the steps may be repeated presenting subsequent bid(s) until the consumer selects a bidder. In each instance, the consumer may select a previously displayed bid which the consumer originally rejected.

It will be also be recognized that Steps 124M through 128M and 124S through 128S may be intermingled. In one example, the process may result in a single lowest bid for the consumer to consider (Step 124S) followed by multiple next lowest bids to consider (Step 127M).

Figure 1E:
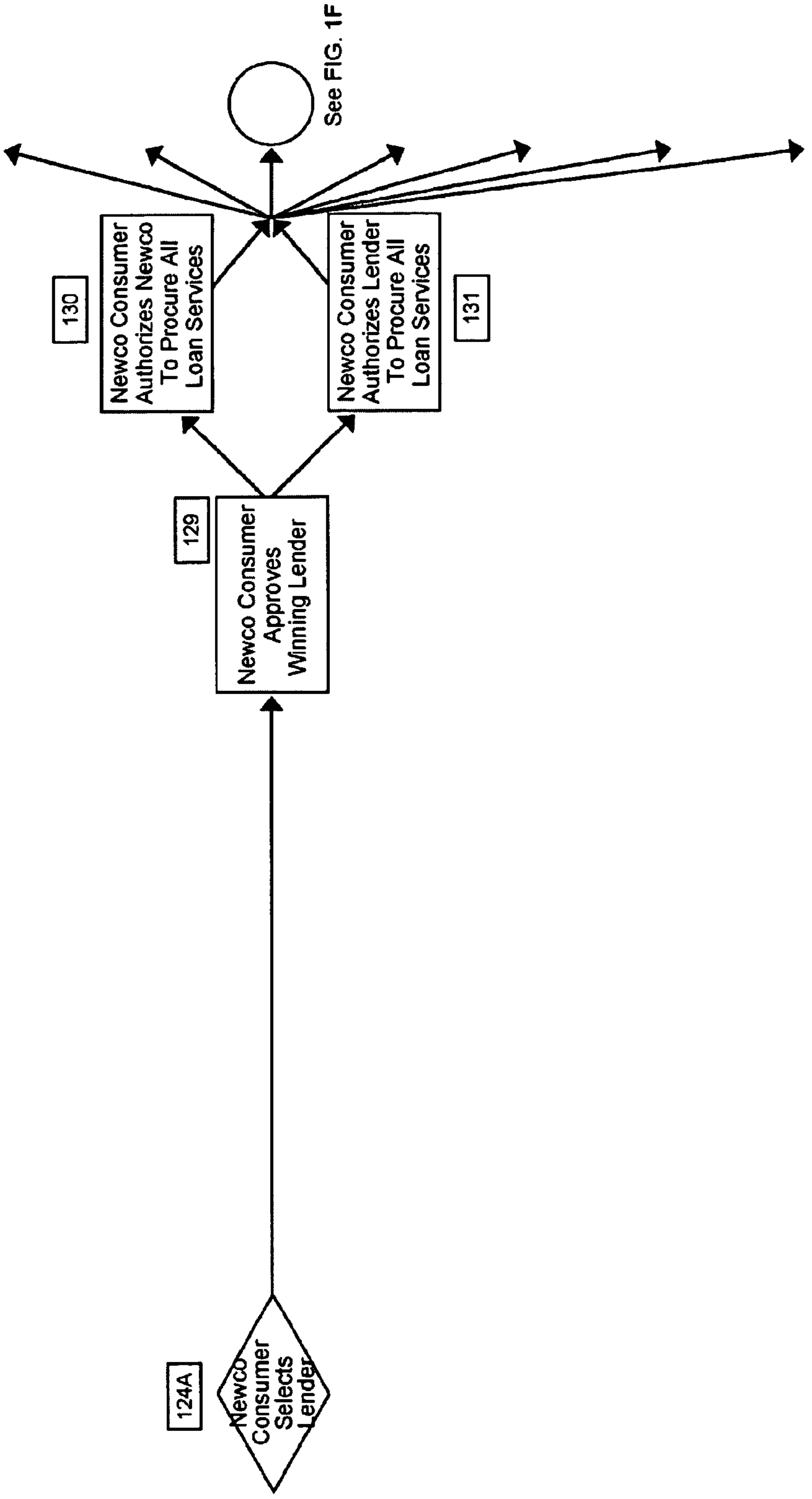

In another alternate embodiment, as shown in FIG. 1E, if in step 123 Newco displays the names of all bidders, then in step 124A Newco Consumer selects a Lender.

Once Newco Consumer has selected a lender, by one of the above procedures, in step 129 Newco Consumer approves the winning lender by electronic confirmation.

Figure 1F:
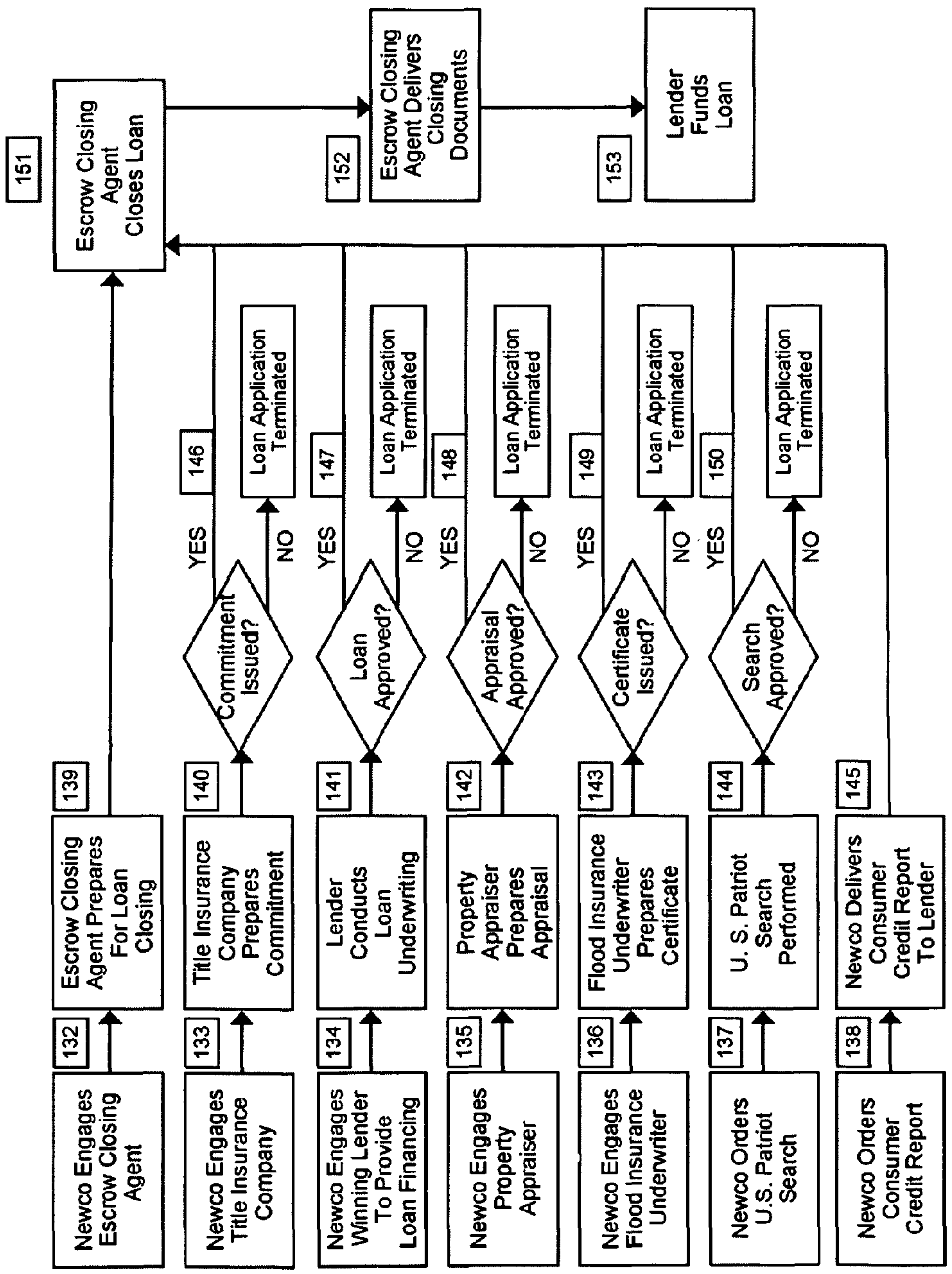

After the consumer selects and approves a bidder, the consumer may engage the company, the selected bidder, an independent third party agent, or a combination of these to provide all processing requirements, which may include but are not limited to escrow services, loan closing services, title insurance, credit reports, etc. as shown in Steps 132 through 150 in FIG. 1F. For example, in step 130 Newco Consumer may engage Newco to procure all necessary loan services on his behalf in order to close the loan. Alternatively, in step 131 Newco Consumer may execute an electronic agreement with the selected Lender to procure all necessary loan services on behalf of the Newco Consumer in order to close the loan.

Examples of loan services are now described with respect to steps 132-150. It is to be appreciated that the number or bids, sellers and consumers is arbitrary and subject to change based on implementation. Persons of skill in the art will recognize that not all of the steps discussed above will be utilized for different products. For example, title insurance is not required for the purchase of a life insurance product. Similarly, it is not necessary to perform a property appraisal for a tangible product, such as an appliance.

In a preferred embodiment, Newco Consumer can electronically access through the web-site the progress and status of his loan application 24 hours per day, 7 days per week in as close to real time as technologically possible.

In step 132 Newco engages an Escrow Closing Agent to close loan. In step 139 Escrow Closing Agent prepares for loan closing.

In step 133 Newco engages a Title Insurance Company to provide title insurance (if required for this type of loan). In step 140 Title Insurance Company prepares title insurance policy. In step 146, if Title Insurance Company refuses to issue a commitment to provide title insurance, the Loan Application is terminated.

In step 134 Newco engages a Lender to provide loan financing. In step 141 Lender conducts loan underwriting. In step 147, if the Lender does not approve the loan request by issuing a commitment to lend, the Loan Application is terminated.

In step 135 Newco engages a Property Appraiser to appraise the property (if required for this type of loan). In step 142 a Property Appraiser prepares appraisal. In step 148, if the property appraisal does not provide sufficient value to satisfy the lender's underwriting criteria, the Loan Application is terminated.

In step 136 Newco engages a Flood Certification Company to provide flood certificate (if required for this type of loan). In step 143 a Flood Certification Company prepares flood certificate. In step 149, if the Flood Certification Company does not issue a flood certificate, the Loan Application is terminated.

In step 137 Newco orders a U.S. Patriot Search (if required for this type of loan). In step 144 a U.S. Patriot search performed. In step 150, if the U.S. Patriot Search is not approved, the Loan Application is terminated.

In step 138 Newco orders a consumer credit report. In step 145 Newco delivers a consumer credit report to Lender.

If steps 146 through 150 inclusive are YES, the Loan Application process proceeds to step 151.

In step 151 Escrow Closing Agent coordinates all closing activities and closes the loan.

In step 152 Escrow Closing Agent delivers closing documents to all appropriate parties In step 153 Lender funds loan and Escrow Closing Agent disburses funds.

FIG. 2 (FIGS. 2A-2C) shows the process from the standpoint of the lender.

In step 201, a lender enters the market to make loans to purchase a home and/or refinance an existing home mortgage loan, a Home Equity Loan or Line of Credit, automobile loans, boat loans, or any other form of consumer-based loans.

In step 202, the lender logs into Newco's secure, private Web-Site on the World Wide Web through an Internet connection after being approved by Newco to participate in Newco Loan auctions. From this point forward the lender will be referred to as Newco Lender.

In step 203, Newco Lender accesses Newco's database of loan applications from all consumers currently seeking loan financing. From this point forward these consumers will be known as Newco Consumers.

Newco Lender may access the following data on all current Newco Consumers: 1) The type of loan desired and amount of loan points to pay, if any 2) The desired term (in years) of the loan, 3) Personal credit information, and 4) Other relevant personal information and applicable collateral information which will be used by prospective lenders to evaluate the creditworthiness of the loan applicant and therefore be fully prepared to submit an accurate offer to provide the loan financing. In a preferred embodiment, Newco Consumer's name is not disclosed. Only the zip code of Newco Consumer's address is disclosed.

In step 204, Newco Lender may filter all the Loan Applications using a custom interface which will sort the applications based upon specified parameters (loan type, loan term, credit, Zip Code, and applicable collateral information) and then segregate those Loan Applications which meet each of Newco Lender's lending criteria.

Alternatively, in step 205, Newco Lender may filter all the Loan Applications using Web-based sorting tools, which will sort the applications based upon specified parameters (loan type, loan term, credit, Zip Code, and applicable collateral information) and then segregate those loans applications that meet each of Newco Lender's lending criteria.

Newco Lenders will have access to all Newco Consumers and will have the choice of using a custom interface or Newco's Web-based filtering software.

In step 206, Newco Lender reviews a loan application to determine if it meets the Newco Lender's criteria. If the loan application does not meet Newco Lender's criteria, in step 207, Newco Lender does not bid on the loan application. If the loan application does meet Newco Lender's criteria, in step 208, Newco Lender prepares its bid(s) for the Newco Loan Auction. At the same time, all other interested Newco Lenders prepare their bid(s) for the Newco Loan auction.

In step 209, the Newco Loan auction begins at its established time.

In step 210, Newco Lenders interested in providing loan financing to this particular Newco Consumer submit their first bid to the Newco Loan Auction, which is conducted over the Internet on the Newco Web-site in as close to real time as technologically possible. Bids may be submitted manually, or by using Newco's automated bidding tools, or by using a custom interface. In a preferred embodiment, the bid will contain one or more defined variables, such as an interest rate and/or loan points or other loan costs. In a more preferred embodiment, the bid will contain one variable, such as interest rate. Persons of skill in the art will recognize that during the bidding process some or all of the loan application data and the defined bid variables may not be disclosed and other loan application data and the defined bid variables may be disclosed. In a preferred embodiment, during the bidding process the identities of the consumer and potential lenders are not disclosed to each other.

Using Web 2.0 related technologies, all bids submitted by all Newco Lenders are displayed confidentially to the Newco Consumer on the password-protected, secure portion of the public web-site. The bids are displayed in as close to real time as technologically possible. This Loan Auction is displayed only to this particular Newco Consumer and not all Newco Consumers currently conducting their own Newco Loan Auctions. Bids will be in the form of an interest rate and may include other loan costs. As the Newco Lenders' bids are displayed to the Newco Consumer on his web-site, all of the Newco Lenders' bids will be simultaneously displayed in as close to real time as technologically possible to all bidding Newco Lenders. The Newco Loan Auction process will trigger competition as a result of the full disclosure of competitive bids.

In an alternate embodiment, some or all of the bids may be displayed to the consumer and to all approved and potential lenders. In another alternate embodiment, some or all of the bids may be displayed to the consumer and to interested lenders, which are lenders whose transaction requirements match the consumer's loan application data but have not yet submitted a bid. In another alternate embodiment, some or all of the bids may be displayed to the consumer and to one or more bidding lenders. In another alternate embodiment, some or all of the bids may be displayed only to the consumer. The consumer accesses the bids through the consumer page and the lender accesses the bids through the lender page. In an alternate embodiment, the lender accesses the bids through the public web page or web pages. In another alternate embodiment, the consumer and the lender access bids through a common web page or web pages. Preferably, the bids are displayed after the bids are submitted in as close to real time as possible.

After reviewing competing loan bids, each Newco Lender participating in a particular Newco Loan Auction will decide whether to submit a new, lower bid. All Newco Lenders interested in submitting a new, lower bid may then submit a new, lower bid, which, in turn, is displayed to the Newco Consumer and all bidding Newco Lenders. Newco Lenders may also decide not to submit a new lower bid and stop bidding. The bidding process continues until the end of the auction at the time predetermined by Newco Consumer.

Step 212 represents the display of the new bid(s) to both the consumer and the lenders as described above.

In a preferred embodiment, the process is repeated until the potential lenders either drop out of the bidding, submit a final bid or the auction terminates at a predetermined time. The offering of both first and subsequent bids may be done automatically by a computer or manually by an operator observing the progress of the process. The process will repeat until the auction terminates.

In step 211, the Newco Loan Auction terminates at the predetermined time. All final bids must be submitted prior to the auction termination.

In step 212, the lowest loan rate or rates and loan costs (points), if applicable, are displayed to the Newco Consumer. In a preferred embodiment, the name or names of the bidders are not displayed to Newco Consumer.

In step 213, Newco Consumer selects a Newco Lender.

In step 214, it is determined whether a particular Newco Lender has been selected by the Newco Consumer.

In step 215, if Newco Consumer does not select a particular Newco Lender, that Newco Lender loses the opportunity to provide loan financing to this Newco Consumer.

In step 216, if Newco Consumer selects a particular Newco Lender, that Newco Lender wins the bid. Newco engages this Newco Lender to provide the loan financing to this Newco Consumer.

Newco or the Lender then procures all loan services. Newco Consumer can electronically access through the Web-site the progress and status of his loan application 24 hours per day, 7 days per week in as close to real time as technologically possible.

In step 217 Newco Lender conducts loan underwriting. In step 218, Newco determines in Newco Lender has approved the loan. If the Newco Lender does not approve the loan application by issuing a commitment to lend, in step 219 the Loan application is terminated.

After being approved, in step 220 the Escrow Closing Agent or Loan Closing Agent coordinates all closing activities and closes the loan.

In step 221 Escrow Closing Agent or Loan Closing Agent delivers all closing documents to appropriate parties.

In step 222 Newco Lender funds loan and Escrow Closing Agent or Loan Closing Agent disburses funds.

Persons of skill in the art will also recognize that this method may be used to purchase a tangible product, such as an automobile, or an intangible product, such as an automobile loan. Alternatively, the method allows the consumer to purchase a tangible product, such as an automobile, and an intangible product, such as an automobile loan, in two separate transactions. In another alternative, the method allows the consumer to purchase a tangible product, such as an automobile, and an intangible product, such as an automobile loan, in one transaction.

FIGS. 3 and 4 illustrate the steps of the process for a consumer insurance product.

As shown in FIG. 3 (FIGS. 3A-3F), in step 301, a consumer enters the market to purchase home-owners, automobile or other vehicle, or life insurance.

In step 302, the consumer visits Newco's secure, public Web-Site on the World Wide Web through an Internet connection.

In step 303, the consumer reviews all pertinent data published on the web-site regarding method of operations and costs and decides whether to continue with the Newco insurance process.

In step 304, if the consumer determines the Newco insurance process does not meet his needs, the consumer may terminate the process without cost or obligation.

If the consumer determines the Newco insurance process does meet his needs, the consumer continues with the Newco insurance application process. From this point forward the insurance applicant is referred to as a "Newco Consumer."

In step 305, Newco Consumer submits one or more transaction requirements in one or more established transaction parameters. For example, Newco Consumer submits the following data via the internet through a password-protected, secure, private connection: 1) The type of insurance desired, 2) The desired coverages of the insurance, and 3) Relevant personal and applicable asset information which will be used by prospective insurers to evaluate the creditworthiness of the insurance applicant and therefore be fully prepared to submit an accurate offer to provide the desired insurance. In a preferred embodiment, Newco Consumer's name will not be disclosed to prospective insurers. Only the zip code of Newco Consumer's address is disclosed.

Newco Consumer is also prompted to select an auction period within a set of established parameters. The Newco Insurance Auction will automatically commence and terminate at the selected times.

In step 306, Newco Consumer completes the insurance application. Newco Consumer attests that the data being submitted is accurate and correct and holds Newco and the Insurer harmless in the event the data submitted is inaccurate. The Newco website verifies accuracy and completeness of the application.

If Newco computer reviews the data and determines an error has been made, in step 307, Newco Consumer is prompted to correct the submission.

After Newco Consumer submits accurate and correct data, in step 308, Newco stores the submitted data.

In step 309, Newco Consumer's insurance application data is transmitted to Newco's private web-site, which may only be accessed by approved insurers who have been authorized to submit insurance offers to Newco Consumers. From this point forward these approved insurers are referred to as "Newco Insurers."

As discussed below with respect to FIG. 4 (FIGS. 4A-4C), approved Newco Insurers may sort or filter pending Newco insurance applications and determine which applications to bid on and which applications to not bid on.

In step 311, at the time predetermined by Newco consumer, the Newco Insurance Auction begins.

In step 312, all Newco Insurers interested in providing insurance to this particular Newco Consumer submit their first bid. In a preferred embodiment, the bid will contain one or more defined variables, such as a price and/or rate. In a more preferred embodiment, the bid will contain one variable, such as rate.

In step 313, using Web 2.0 related technologies, all bids submitted by all Newco Insurers are displayed confidentially to the Newco Consumer on the password-protected, secure portion of the public web-site. The bids are displayed in as close to real time as technologically possible. This Insurance Auction is displayed only to this particular Newco Consumer and not all Newco Consumers currently conducting their own Newco Insurance Auctions.

As the Newco Insurers' bids are displayed to the Newco Consumer on his website, all of the Newco Insurers' bids will be simultaneously displayed in as close to real time as technologically possible to all bidding Newco Insurers. The Newco Insurance Auction process will trigger competition as a result of the full disclosure of competitive bids.

After reviewing competing bids, in step 314, each Newco Insurer participating in a particular Newco Insurance Auction will decide whether to submit a new, lower bid. All Newco Insurers interested in submitting a new, lower bid may then submit a new, lower bid, which, in turn, is displayed to the Newco Consumer and all bidding Newco Insurers. Newco Lender may also decide not to submit a new lower bid and, in step 315, stop bidding. The bidding process continues until the end of the auction at the time predetermined by Newco Consumer. The offering of both first and subsequent bids may be done automatically by a computer or manually by an operator observing the progress of the process.

In step 316, the Newco Insurance Auction terminates at the predetermined time. All final bids must be submitted prior to the auction termination.

In step 317, the lowest insurance price or rate and insurance costs, if applicable, are displayed to the Newco Consumer. The name or names of the bidders are NOT displayed to the Newco Consumer.

In step 318, Newco Consumer decides whether the lowest insurance price or rate and insurance costs, if applicable, presented are acceptable. If Newco Consumer determines that the price or rate and insurance costs, if applicable, presented are unacceptable, Newco Consumer can terminate the process in step 319. Alternatively, if Newco Consumer determines that the price or rate and insurance costs, if applicable, presented are acceptable, in step 320, Newco Consumer may execute an agreement with Newco. Newco Consumer executes an agreement electronically to have Newco procure all insurance services on the consumer's behalf. Newco Consumer pays Newco a fee via a credit card over the internet.

In step 321, once Newco Consumer has executed the agreement and paid the fee, Newco displays the names of the multiple, identical low bidders. Alternatively, in step 322, once Newco Consumer has executed the agreement and paid the fee, Newco displays the name of the single low bidder. In another alternative embodiment, in step 323, once Newco Consumer has executed the agreement and paid the fee, Newco displays the names of all bidders.

In step 324M, if there are multiple identical lowest bidders, then Newco Consumer evaluates the names of the low bidders and decides which one to accept based upon any brand loyalties or brand aversions. Newco Consumer may select one of the multiple identical lowest bidders, or if the lowest bidders are unacceptable to Newco Consumer, Newco may give Newco Consumer the option to view the name(s) of the next lowest bidder(s).

In step 325M, the name(s) of the next lowest bidder(s) are presented to Newco Consumer.

In step 326M, Newco Consumer evaluates the next lowest bidder(s) and determines if the bidder(s) is/are acceptable based upon any brand loyalty or brand aversion. Newco Consumer may select a bidder, or, if the next lowest bidder(s) are unacceptable to Newco Consumer, Newco may give Newco Consumer the option to view the names of the next lowest bidder(s), or, Newco may give Newco Consumer the option to return to any of the previously displayed bidders.

In step 327M, the name(s) of the next lowest bidder(s) are presented to Newco Consumer.

In step 328M, Newco Consumer evaluates the next lowest bidder(s) and determines if the bidder(s) is/are acceptable based upon any brand loyalty or brand aversion. Newco Consumer may select a bidder, or, if the next lowest bidder(s) are unacceptable to Newco Consumer, Newco may give Newco Consumer the option to view the names of the next lowest bidder(s), or, Newco may give Newco Consumer the option to return to any of the previously displayed bidders.

Alternatively, in step 324S, if there is one single lowest bid, the Newco Consumer evaluates the lowest bidder and determines if that lowest bidder is acceptable based upon any brand loyalty or brand aversion. Newco Consumer may select the lowest bidder, or, if the single lowest bidder is unacceptable to Newco Consumer, Newco may give Newco Consumer the option to view the name of 2nd lowest bidder.

In step 325S, the name of the 2nd lowest bidder is presented to Newco Consumer.

In step 326S, Newco Consumer evaluates the 2nd lowest bidder and determines if this bidder is acceptable based upon any brand loyalty or brand aversion. Newco Consumer may select the 2nd lowest bidder, or, if the 2nd lowest bidder is unacceptable to Newco Consumer, Newco may give Newco Consumer the option to view the name of 3rd lowest bidder, or Newco may give Newco Consumer the option to return to the 1st lowest bidder.

In step 327S, the name of the 3rd lowest bidder is presented to Newco Consumer.

In step 328S, Newco Consumer evaluates the 3rd lowest bidder and determines if this bidder is acceptable based upon any brand loyalty or brand aversion. Newco Consumer may select the 3rd lowest bidder, or, if the 3rd lowest bidder is unacceptable to Newco Consumer, Newco may give Newco Consumer the option to view the name of the 4th lowest bidder (and cycle repeats through 5th, 6th, etc lowest bidder), or, Newco may give Newco Consumer the option to return to the 2nd lowest or 1st lowest bidder.

It will be recognized that the steps may be repeated presenting subsequent bid(s) until the consumer selects a bidder. In each instance, the consumer may select a previously displayed bid which the consumer originally rejected. It will be also be recognized that these steps may be intermingled. In one example, the process may result in a single lowest bid for the consumer to consider (Step 325S) followed by multiple next lowest bids to consider (Step 327M).

Figure 3A:
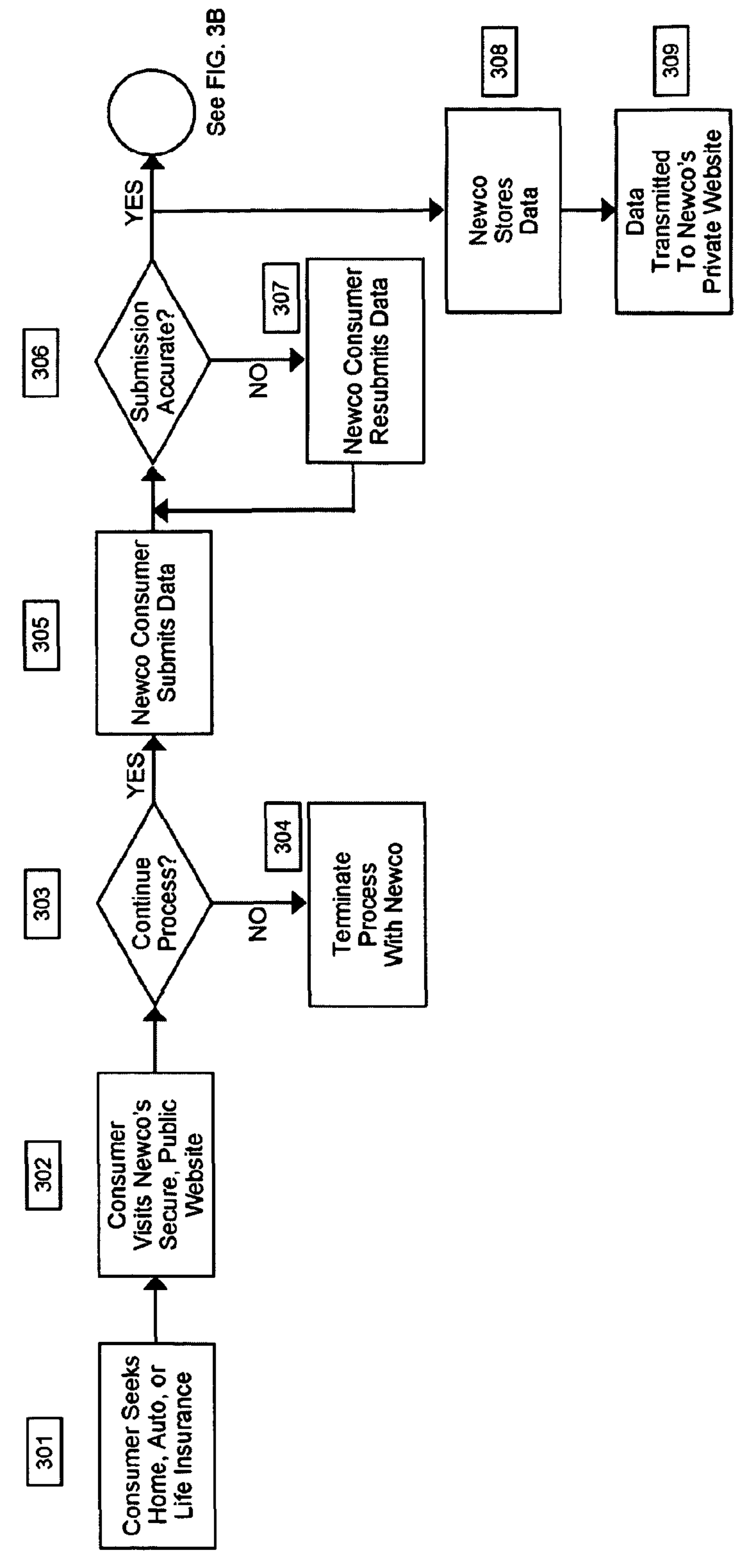
FIG. 3 (FIGS. 3A-3F) is a flow diagram depicting the steps of the method performed by an insurance consumer wishing to access the method and system of the present invention.
Figure 3B:
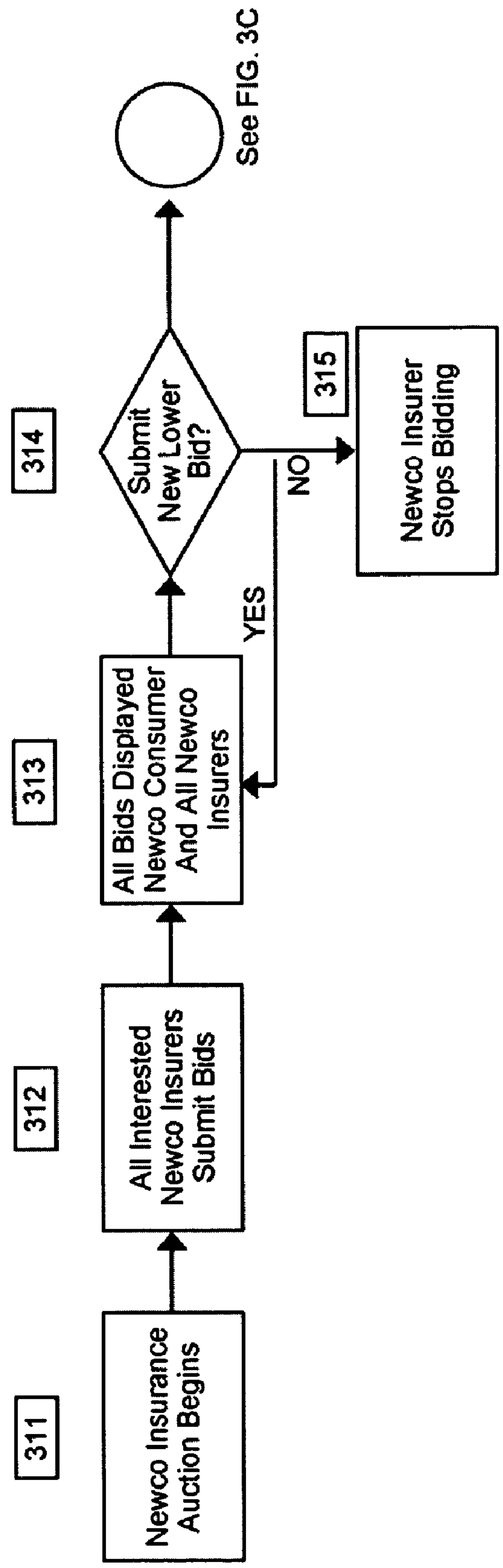
Figure 3C:
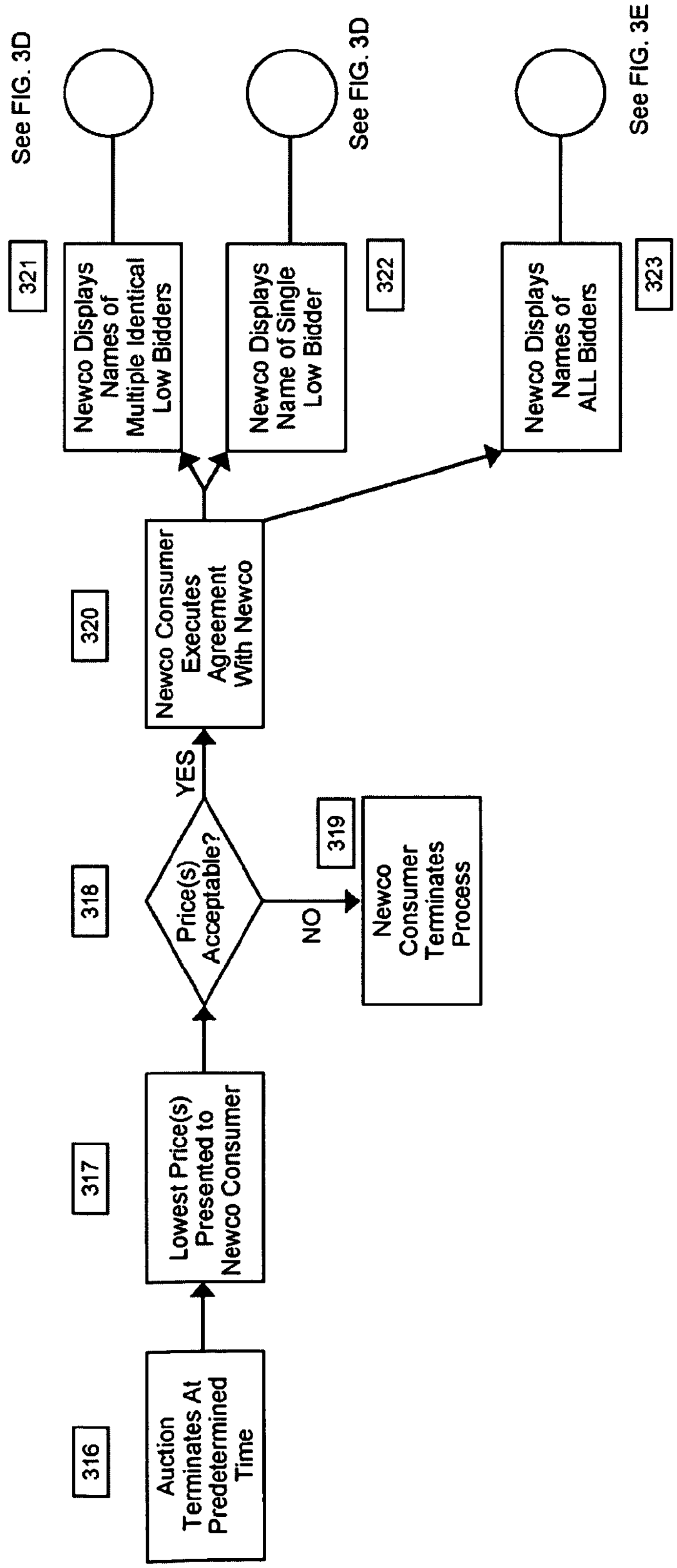
Figure 3D:
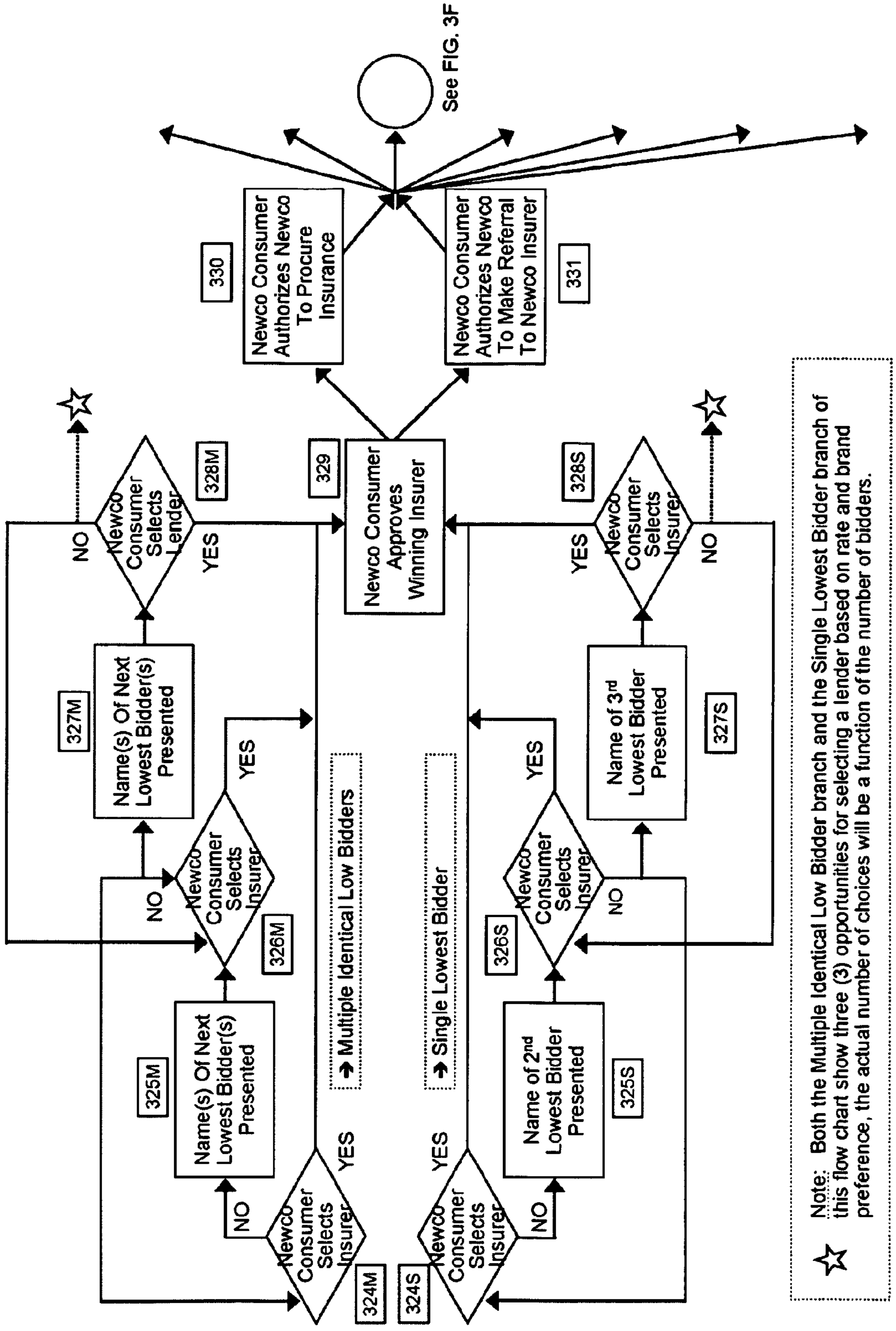
Figure 3E:
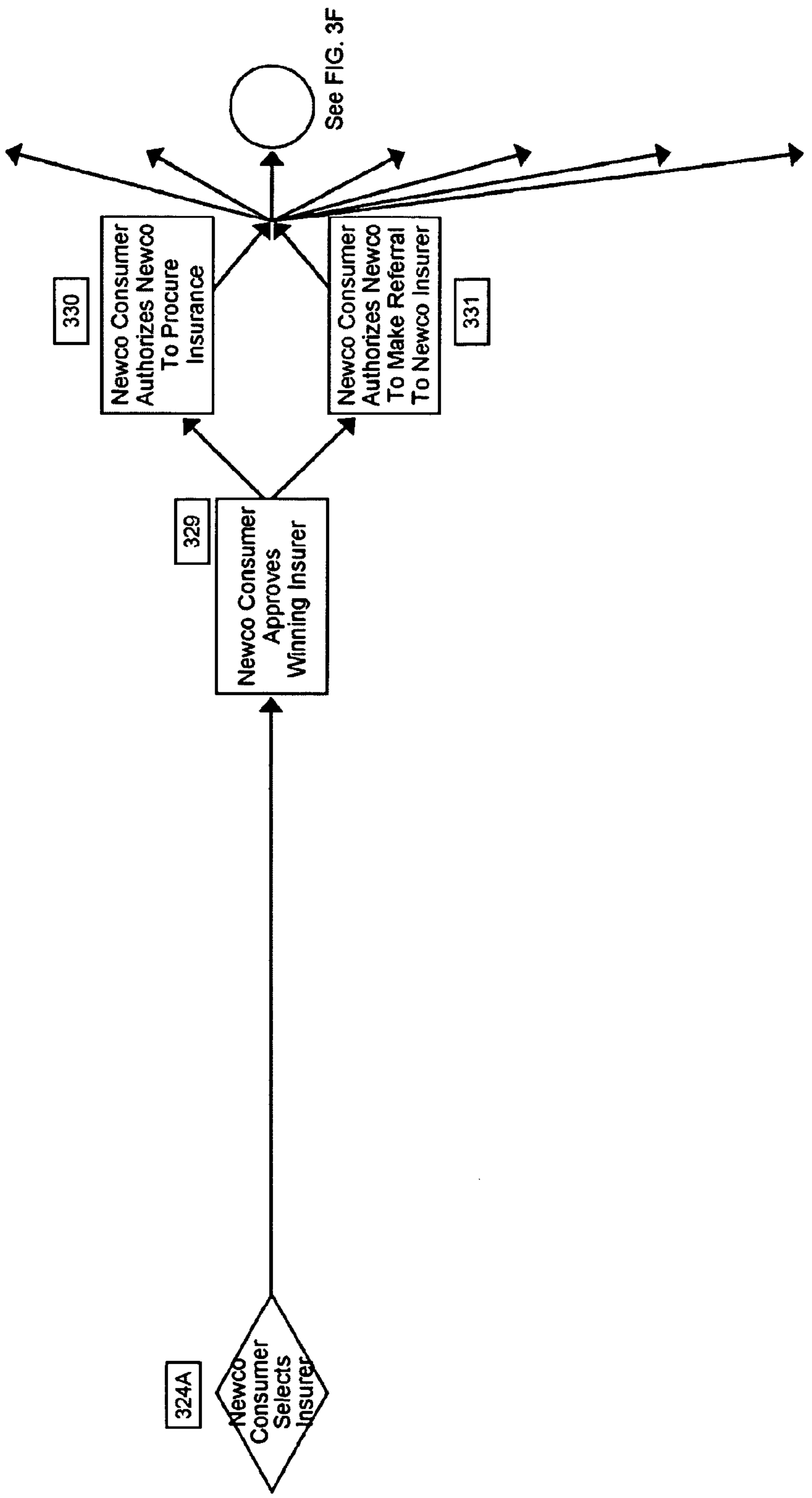
Figure 3F:
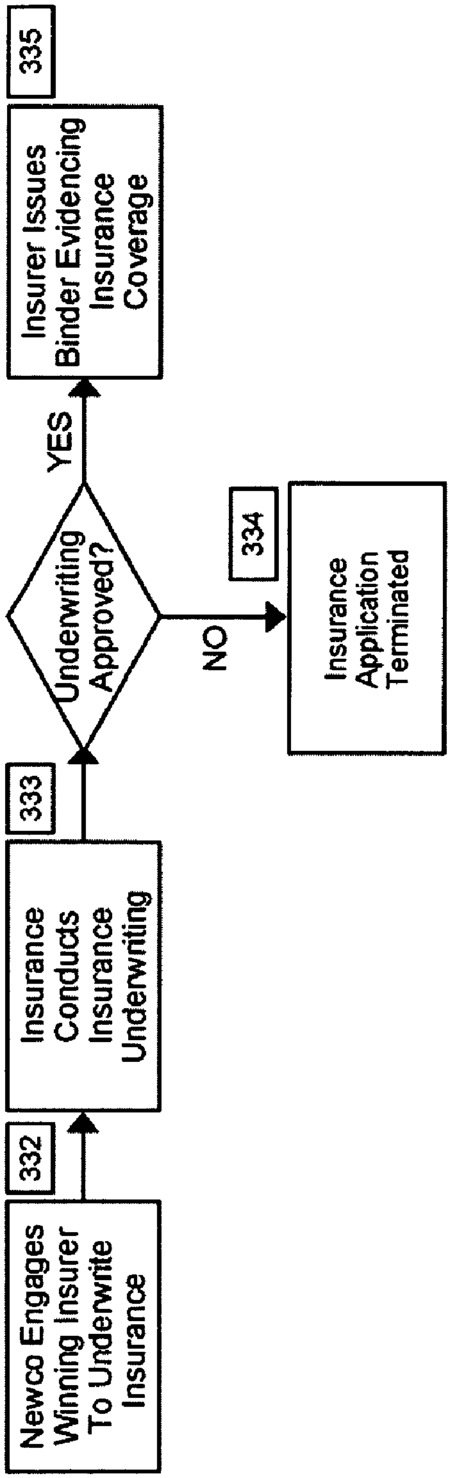

In another alternate embodiment, as shown in FIG. 3E, if in step 323 Newco displays the names of all bidders, then in step 324A Newco Consumer selects an Insurer.

Once Newco Consumer has selected a insurer, by one of the above procedures, in step 329 Newco Consumer approves the winning insurer by electronic confirmation.

After the consumer selects and approves a bidder, in step 330, the consumer may engage Newco to procure the insurance, or in step 331, Newco Consumer authorizes Newco to make a referral on Newco Consumer's behalf to the Newco Insurer.

In step 332 Newco engages Newco Insurer to underwrite insurance

In step 333 Insurer conducts insurance underwriting.

In step 334, if the Insurer does not approve the insurance request by issuing a commitment, the Insurance Application is terminated.

In step 335, Insurer issues binder evidencing insurance coverage.

Figure 4A:
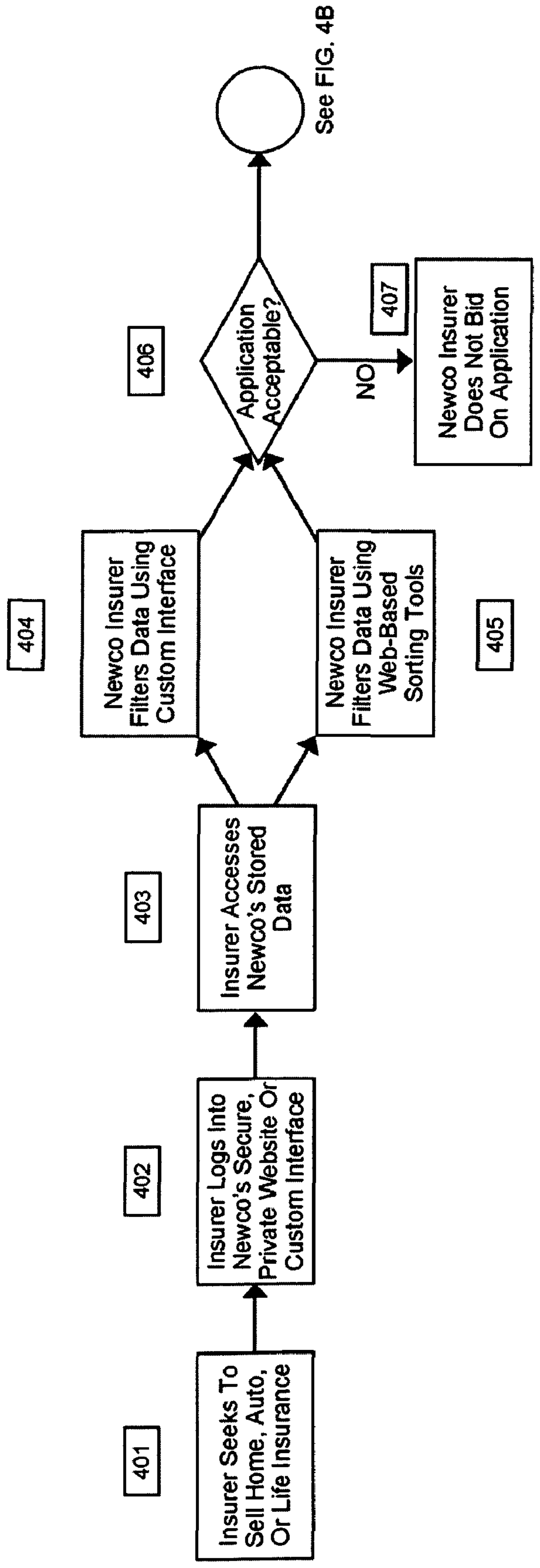
FIG. 4 (FIGS. 4A-4C) is a flow diagram depicting the steps of the method that are performed by an insurer wishing to access the method and system of the present invention.
Figure 4B:
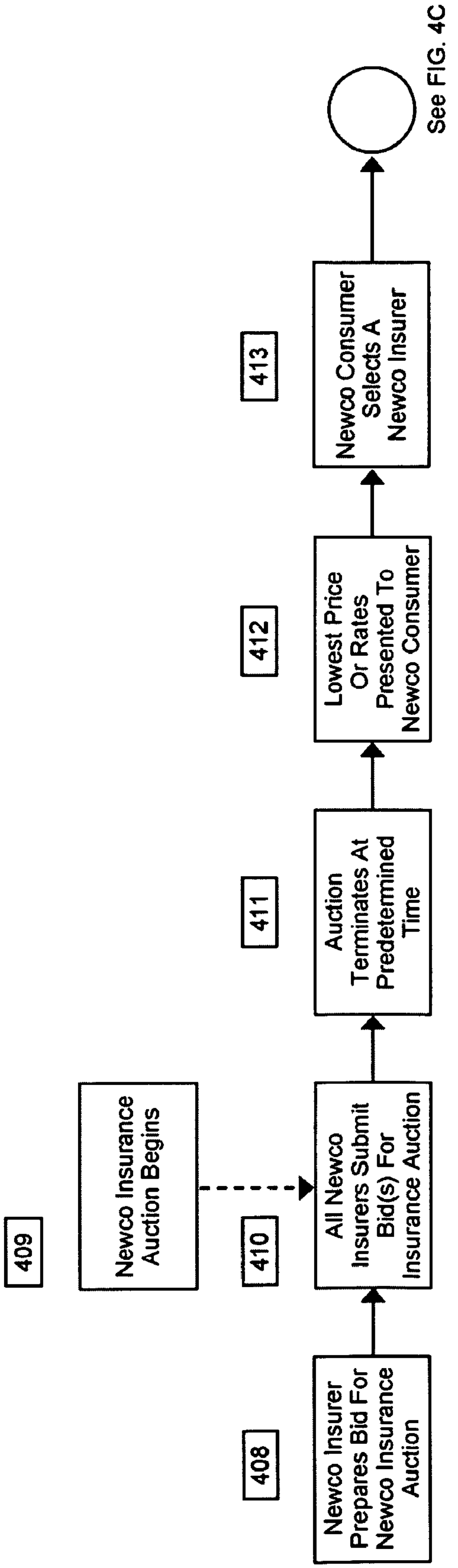
Figure 4C:
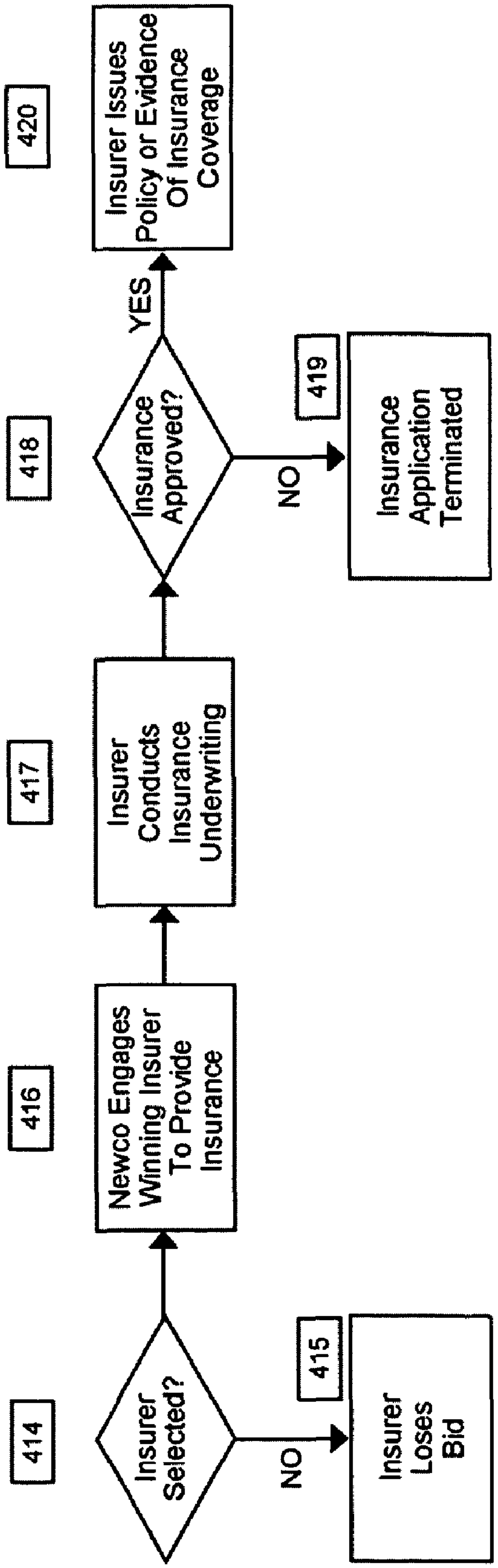

FIG. 4 (FIGS. 4A-4C) shows this process from the standpoint of the insurer.

In step 401, an insurer enters the market to sell homeowners, automobile or vehicle, or life insurance.

In step 402, the insurer logs into Newco's secure, private Web-Site on the World Wide Web through an Internet connection after being approved by Newco to participate in Newco Insurance auctions. From this point forward the Insurer will be referred to as Newco Insurer.

In step 403, Newco Insurer accesses Newco's database of insurance applications from all consumers currently seeking insurance. From this point forward these consumers will be known as Newco Consumers.

Newco Insurer accesses the following data on all current Newco Consumers: 1) The type of insurance desired, 2) The desired insurance coverages, and 3) Personal and other relevant asset information which will be used by prospective Insurers to evaluate the insurance application and therefore be fully prepared to submit an accurate offer to provide the insurance. In a preferred embodiment, Newco Consumer's name is not disclosed. Only the zip code of Newco Consumer's address is disclosed.

In step 404, Newco Insurer may filter all the Insurance Applications using a custom interface which will sort the applications based upon specified parameters (insurance type, insurance coverage, Zip Code, and applicable asset information) and then segregate those insurance applications which meet each of Newco Insurer's lending criteria.

Alternatively, in step 405, Newco Insurer may filter all the Insurance Applications using Web-based sorting tools, which will sort the applications based upon specified parameters (insurance type, insurance term, credit, Zip Code, and applicable collateral information) and then segregate those insurance applications that meet each of Newco Insurer's lending criteria.

Newco Insurers will have access to all Newco Consumers and will have the choice of using a custom interface or Newco's Web-based filtering software.

In step 406, Newco Insurer reviews insurance application to determine if it meets Newco Insurer's criteria. If the application does not meet Newco Insurer's criteria, in step 407, Newco Insurer does not bid on the insurance application. If the application does meet Newco Insurer's criteria, in step 408 Newco Insurer prepares its bid(s) for the Newco Insurance Auction. At the same time, all other Newco Insurer prepares their bid(s) for the Newco Insurance auction.

In step 409, the Newco Insurance auctions begins at its established time.

In step 410, Newco Insurers interested in providing insurance to this particular Newco Consumer submit their first bid to the Newco Insurance Auction, which is conducted over the Internet on the Newco Web-site in as close to real time as technologically possible. Bids may be submitted manually, or by using Newco's automated bidding tools, or by using a custom interface. In a preferred embodiment, the bid will contain one or more defined variables, such as price and/or rate and may include other insurance costs. In a more preferred embodiment, the bid will contain one variable, such as price.

Using Web 2.0 related technologies, all bids submitted by all Newco Insurers are displayed confidentially to the Newco Consumer on the password-protected, secure portion of the public web-site. The bids are displayed in as close to real time as technologically possible. This Insurance Auction is displayed only to this particular Newco Consumer and not all Newco Consumers currently conducting their own Newco Insurance Auctions. As the Newco Insurers' bids are displayed to the Newco Consumer on his web-site, all of the Newco Insurers' bids will be simultaneously displayed in as close to real time as technologically possible to all bidding Newco Insurers. The Newco Insurance Auction process will trigger competition as a result of the full disclosure of competitive bids.

After reviewing competing loan bids, each Newco Insurer participating in a particular Newco Insurance Auction will decide whether to submit new, lower bid(s). All Newco Insurers interested in submitting a new, lower bid may then submit a new, lower bid, which, in turn, is displayed to the Newco Consumer and all bidding Newco Insurers. Newco Insurers may also decide not to submit a new lower bid and stop bidding. The process will repeat until the auction terminates.

In step 411, the Newco Insurance Auction terminates at the predetermined time. All final bids must be submitted prior to the auction termination.

In step 412, the lowest insurance price or rate and insurance costs, if applicable, are displayed to Newco Consumer. In a preferred embodiment, the name or names of the bidders are not displayed to Newco Consumer.

In step 413, Newco Consumer selects a Newco Insurer.

In step 414, it is determined whether a particular Newco Insurer was selected by Newco Consumer.

In step 415, if Newco Consumer does not select a particular Newco Insurer, that Newco Insurer loses the opportunity to provide insurance to this Newco Consumer.

In step 416, if Newco Consumer selects a particular Newco Insurer that Newco Insurer wins the bid. Newco engages this Newco Insurer to provide the insurance to this Newco Consumer.

In step 417, Newco Insurer conducts the insurance underwriting. In a preferred embodiment, Newco Consumer can electronically access through the Web-site the progress and status of his insurance application 24 hours per day, 7 days per week in as close to real time as technologically possible.

In step 418, Newco determines in Newco Insurer has approved the insurance application. If Newco Insurer does not approve the insurance application by issuing a commitment, in step 419 the insurance application is terminated. Otherwise, in step 420, Insurer issues the policy or evidence of insurance coverage.

FIGS. 5 and 6 depict the process for purchasing and selling a consumer products product.

As shown in FIG. 5 (FIGS. 5A-5F), in step 501, a consumer enters the market to purchase a consumer product, for example, a non-custom, "big-ticket" item, such as a vehicle (an automobile, a truck, a recreational vehicle, a boat, etc.) an appliance (kitchen or audio or visual) or any other non-custom, high-value item.

In step 502, the consumer visits Newco's secure, public Web-Site on the World Wide Web through an Internet connection.

In step 503, the consumer reviews all pertinent data published on the web-site regarding method of operations and costs and decides whether to continue with Newco product purchase process.

In step 504, if the consumer determines the Newco product purchase process does not meet his needs, the consumer may terminate the process without cost or obligation.

If the consumer determines the Newco product purchase process does meet his needs, the consumer continues with the Newco product purchase process. From this point forward the prospective product purchaser is referred to as a "Newco Consumer."

In step 505, Newco Consumer submits one or more transaction requirements in one or more established transaction parameters. For example, Newco Consumer submits the following data via the internet through a password-protected, secure, private connection: 1) The type of product desired, 2) The desired features of the product, 3) Relevant personal information used to determine the Newco Consumer's ability to pay for the purchase which will be used by prospective sellers to evaluate the creditworthiness of the Newco Consumer and therefore be fully prepared to submit an accurate offer to provide the product. In a preferred embodiment, Newco Consumer's name is not disclosed to prospective sellers. Only the zip code of Newco Consumer's address is disclosed.

Newco Consumer is also prompted to select an auction period within a set of established parameters. The Newco Product Auction will automatically commence and terminate at the selected times.

In step 506, Newco Consumer completes the product application. Newco Consumer attests that the data being submitted is accurate and correct and holds Newco and the Seller harmless in the event the data submitted is inaccurate. The Newco web-site verifies accuracy and completeness of the application.

If Newco computer reviews the data and determines an error has been made, in step 507, Newco Consumer is prompted to correct the submission.

After Newco Consumer submits accurate and correct data, in step 508, Newco stores the submitted data.

In step 509, Newco Consumer product application data transmitted to Newco private web-site which may only be accessed by approved sellers who have been authorized to submit product offers to Newco Consumers. From this point forward these approved sellers are referred to as "Newco Sellers."

As discussed below with respect to FIG. 6 (FIGS. 6A-6C), approved sellers may sort or filter pending Newco product applications and determine which applications to bid on and which applications to not bid on.

In step 511, at the time predetermined by Newco consumer, the Newco Product Auction.

In step 512, all Newco Sellers interested in providing the product to this particular Newco Consumer submit their first bid. In a preferred embodiment, the bid will contain one or more defined variables, such as price and/or other product costs. In a more preferred embodiment, the bid will contain one variable, such as price.

In step 513, using Web 2.0 related technologies, all bids submitted by all Newco Sellers are displayed confidentially to the Newco Consumer on the password-protected, secure portion of the public web-site. The bids are displayed in as close to real time as technologically possible. This Product Auction is displayed only to this particular Newco Consumer and not all Newco Consumers currently conducting their own Newco Product Auctions.

As the Newco Sellers' bids are displayed to the Newco Consumer on his web-site, all of the Newco Sellers' bids will be simultaneously displayed in as close to real time as technologically possible to all bidding Newco Sellers. The Newco Product Auction process will trigger competition as a result of the full disclosure of competitive bids.

After reviewing competing loan bids, in step 514, each Newco Seller participating in a particular Newco Product Auction will decide whether to submit a new, lower bid. All Newco Sellers interested in submitting a new, lower bid may then submit a new, lower bid, which, in turn, is displayed to the Newco Consumer and all bidding Newco Sellers. Newco Seller may also decide not to submit a new lower bid and, in step 515, stop bidding. The bidding process continues until the end of the auction at the time predetermined by Newco Consumer. The offering of both first and subsequent bids may be done automatically by a computer or manually by an operator observing the progress of the process.

In step 516, the Newco Product Auction terminates at the predetermined time. All final bids must be submitted prior to the auction termination.

In step 517, the lowest product price and product costs, if applicable, are displayed to the Newco Consumer. The name or names of the bidders are NOT displayed to the Newco Consumer.

In step 518, Newco Consumer decides whether the lowest product price and product costs, if applicable, presented are acceptable. If Newco Consumer determines that the product price and product costs, if applicable, presented are unacceptable, Newco Consumer can terminate the process in step 519. Alternatively, if Newco Consumer determines that the product price and product costs, if applicable, presented are acceptable, in step 520, Newco Consumer may execute an agreement with Newco. Newco Consumer executes an agreement electronically to have Newco procure all products on the consumer's behalf. Newco Consumer pays Newco a fee via a credit card over the internet.

In step 521, once Newco Consumer has executed the agreement and paid the fee, Newco displays the names of the multiple, identical low bidders. Alternatively, in step 522, once Newco Consumer has executed the agreement and paid the fee, Newco displays the name of the single low bidder. In another alternative embodiment, in step 523 once Newco Consumer has executed the agreement and paid the fee, Newco displays the names of all bidders.

In step 524M, if there are multiple identical lowest bidders, then Newco Consumer evaluates the names of the low bidders and decides which one to accept based upon any brand loyalties or brand aversions. Newco Consumer may select one of the multiple identical lowest bidders, or, if the lowest bidders are unacceptable to Newco Consumer, Newco may give Newco Consumer the option to view the name(s) of the next lowest bidder(s).

In step 525M, the name(s) of the next lowest bidder(s) are presented to Newco Consumer.

In step, 526M Newco Consumer evaluates the next lowest bidder(s) and determines if the bidder(s) is/are acceptable based upon any brand loyalty or brand aversion. Newco Consumer may select a bidder, or, if the next lowest bidder(s) are unacceptable to Newco Consumer, Newco may give Newco Consumer the option to view names of the next lowest bidder (s), or, Newco may give Newco Consumer the option to return to any of the previously displayed bidders.

In step 527M, the name(s) of the next lowest bidder(s) are presented to Newco Consumer.

In step 528M, Newco Consumer evaluates the next lowest bidder(s) and determines if the bidder(s) is/are acceptable based upon any brand loyalty or brand aversion. Newco Consumer may select a bidder, or, if the next lowest bidder(s) are unacceptable to Newco Consumer, Newco may give Newco Consumer the option to view the names of the next lowest bidder(s), or, Newco may give Newco Consumer the option to return to any of the previously displayed bidders.

Alternatively, in step 524S, if there is one single lowest bid, the Newco Consumer evaluates the lowest bidder and determines if that lowest bidder is acceptable based upon any brand loyalty or brand aversion. Newco Consumer may select the lowest bidder, or, if the single lowest bidder is unacceptable to Newco Consumer, Newco may give Newco Consumer the option to view the name of the 2nd lowest bidder.

In step 525S, the name of the 2nd lowest bidder is presented to Newco Consumer.

In step 526S, Newco Consumer evaluates the 2nd lowest bidder and determines if this bidder is acceptable based upon any brand loyalty or brand aversion. Newco Consumer may select the 2nd lowest bidder, or, if the 2nd lowest bidder is unacceptable to Newco Consumer, Newco may give Newco Consumer the option to view name of 3rd lowest bidder, or, Newco may give Newco Consumer the option to return to the 1st lowest bidder.

In step 527S, the name of the 3rd lowest bidder is presented to Newco Consumer.

In step 528S, Newco Consumer evaluates the 3rd lowest bidder and determines if this bidder is acceptable based upon any brand loyalty or brand aversion. Newco Consumer may select the 3rd lowest bidder, or, if the 3rd lowest bidder is unacceptable to Newco Consumer, Newco may give Newco Consumer the option to view the name of the 4th lowest bidder (and cycle repeats through 5th, 6th, etc lowest bidder), or Newco may give Newco Consumer the option to return to the 2nd lowest or 1st lowest bidder.

It will be recognized that the steps may be repeated presenting subsequent bid(s) until the consumer selects a bidder. In each instance, the consumer may select a previously displayed bid which the consumer originally rejected. It will be also be recognized that these steps may be intermingled. In one example, the process may result in a single lowest bid for the consumer to consider (Step 525S) followed by multiple next lowest bids to consider (Step 527M).

Figure 5A:
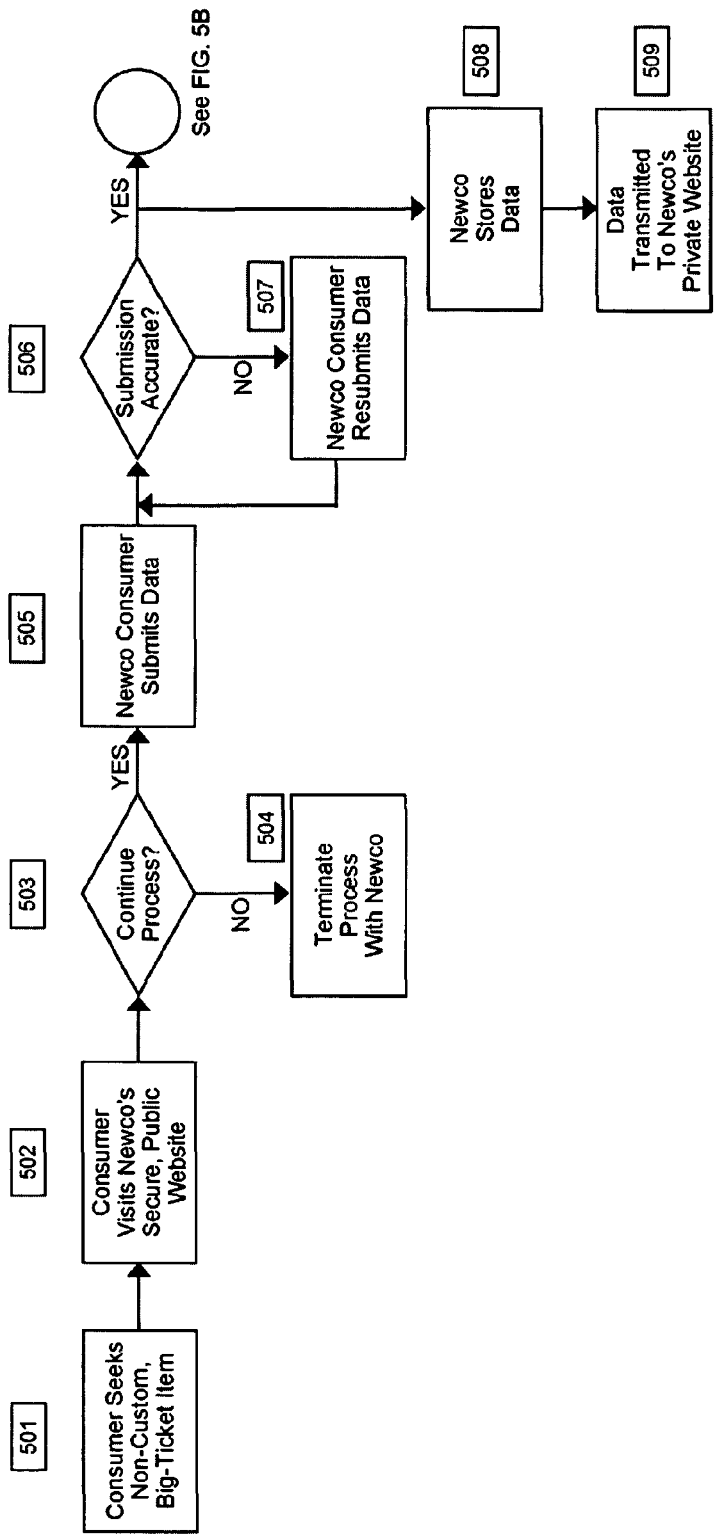
FIG. 5 (FIGS. 5A-5F) is a flow diagram depicting the steps of the method performed by a consumer products consumer wishing to access the method and system of the present invention.
Figure 5B:
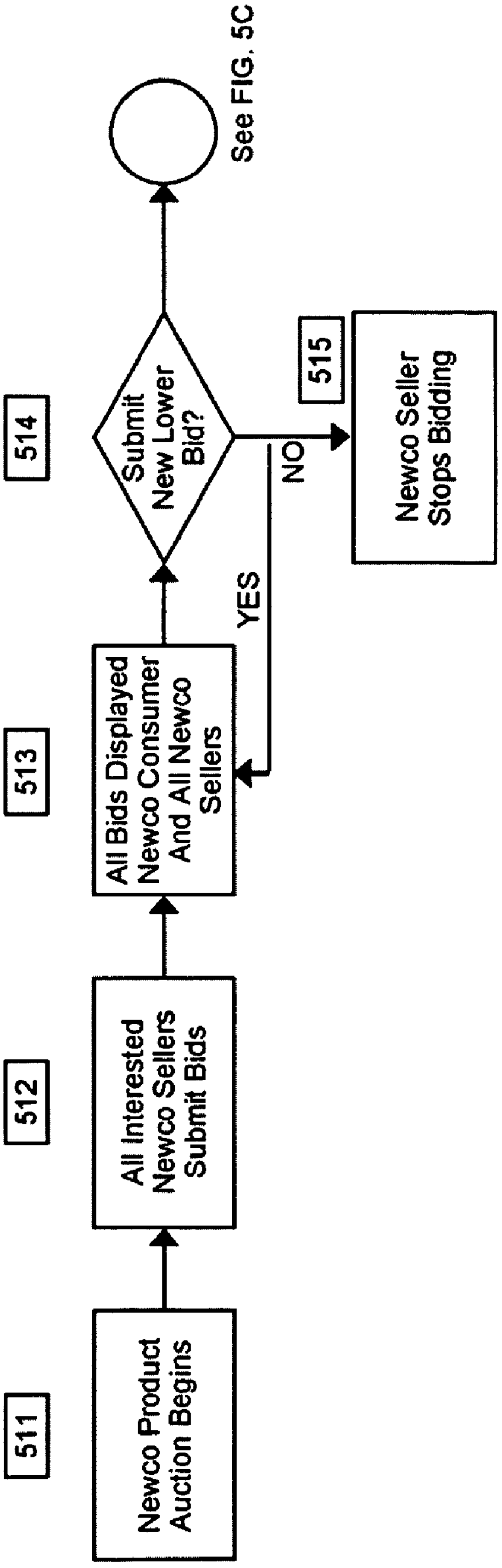
Figure 5C:
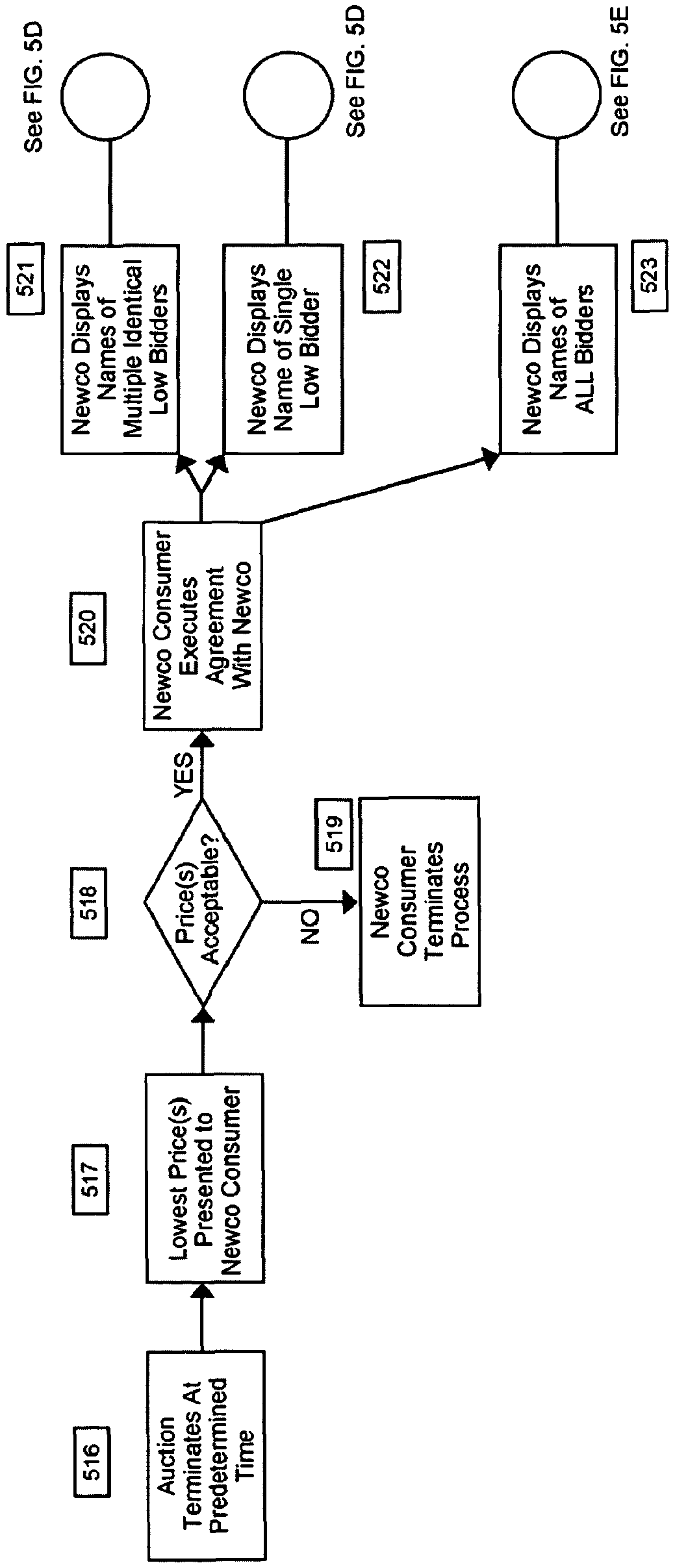
Figure 5D:
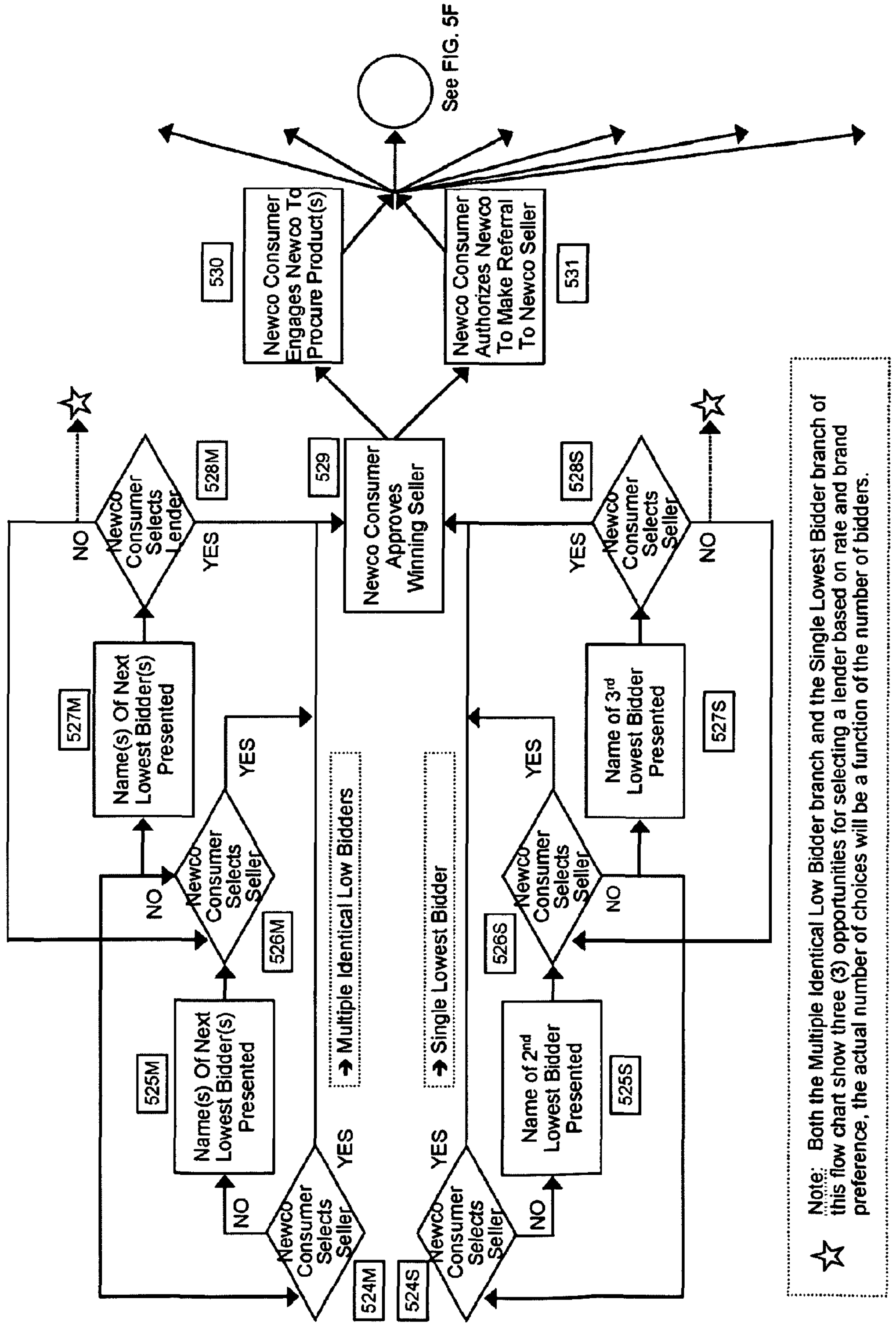
Figure 5E:
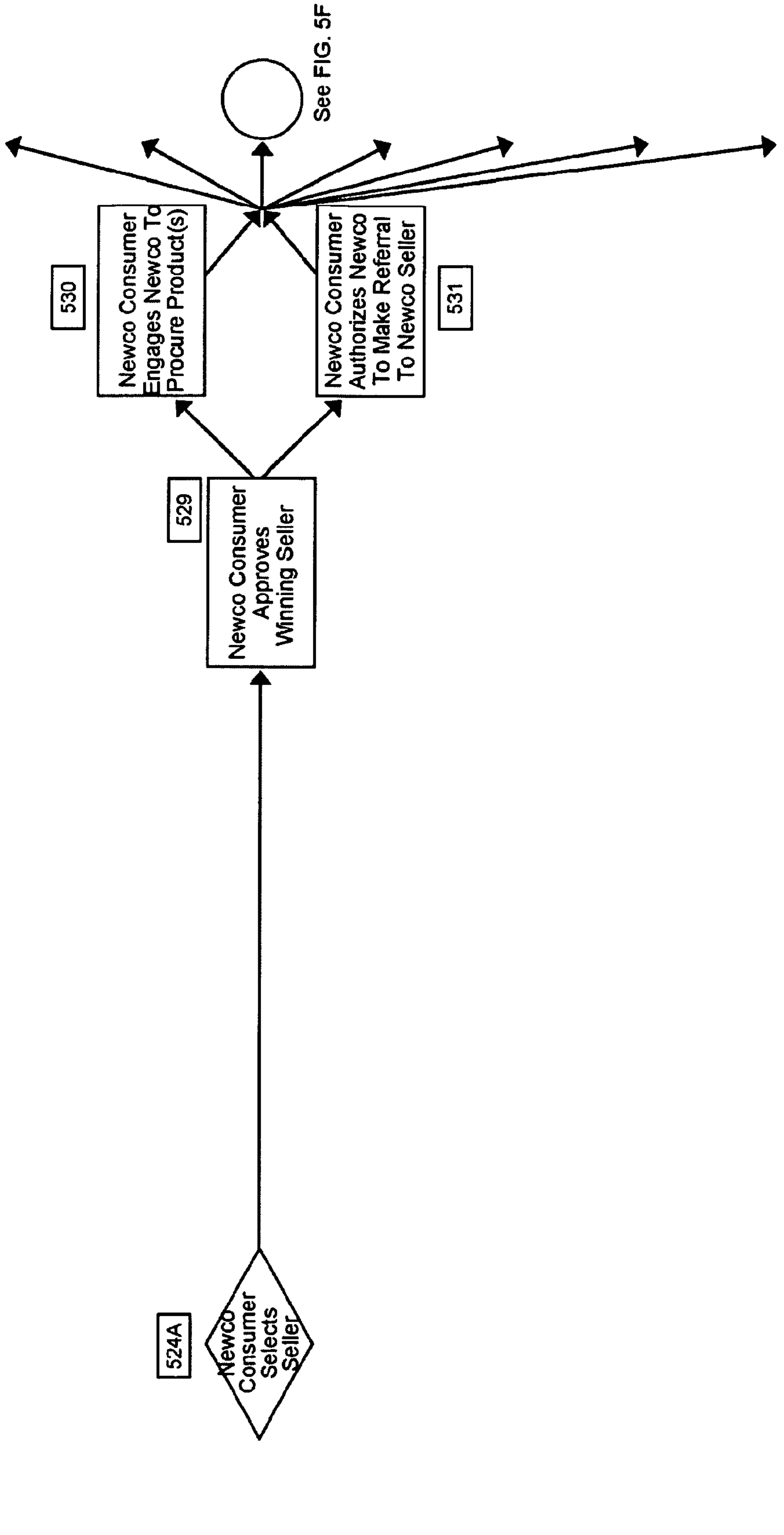
Figure 5F:
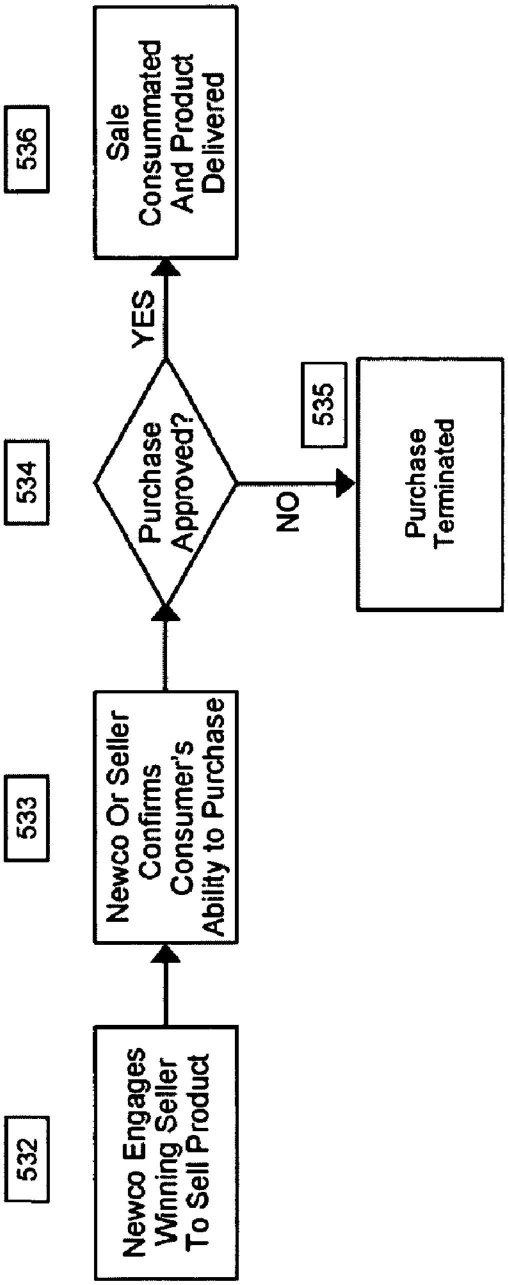

In another alternate embodiment, as shown in FIG. 5E, if in step 523 Newco displays the names of all bidders, then in step 524A Newco Consumer selects a Seller.

Once Newco Consumer has selected a Seller, by one of the above procedures, in step 529 Newco Consumer approves the winning Seller by electronic confirmation.

After the consumer selects and approves a bidder, in step 530, the consumer may engage Newco to procure the product, or, in step 531, Newco Consumer may execute an electronic agreement with the selected Seller to procure the product on behalf of Newco Consumer, in order to consummate the purchase.

In step 532, Newco engages Seller to provide product.

In step 533, Newco or Seller confirms Consumer's ability to purchase

In step 534, the Consumer's ability to make payment to consummate the purchase is assessed. If payment cannot be made, in step 535 the purchase transaction is terminated. Otherwise, in step 536, payment is made and the product is delivered to Newco Consumer.

Figure 6A:
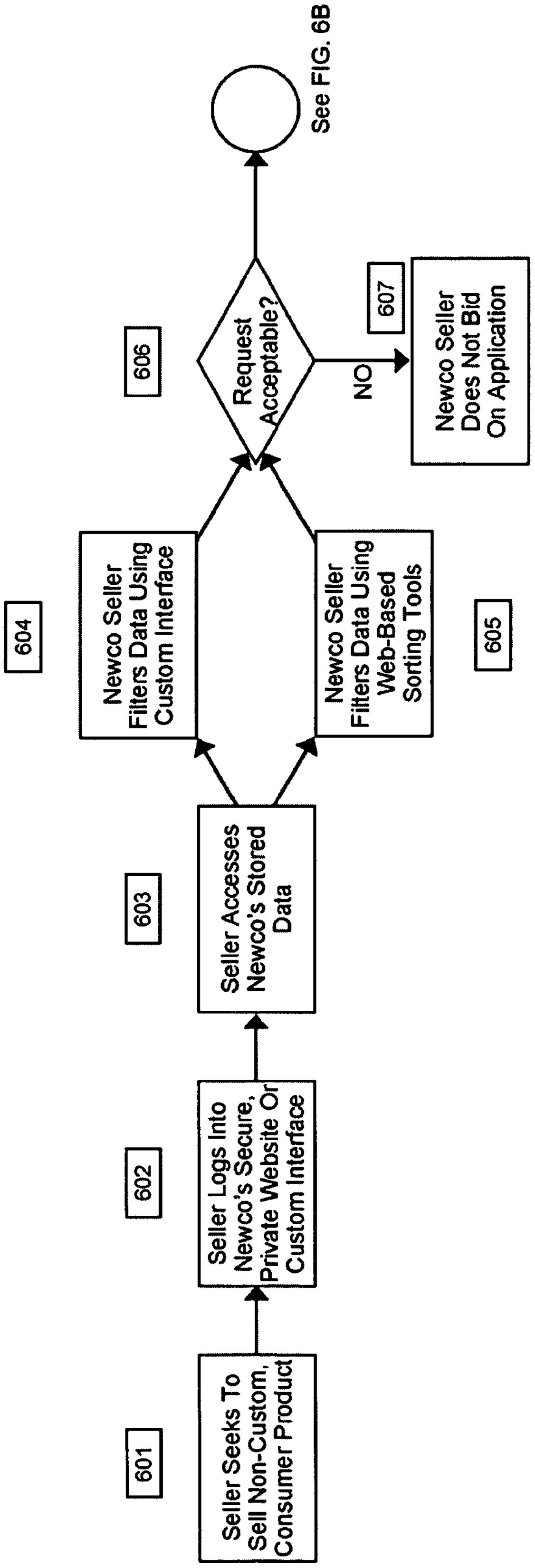
FIG. 6 (FIGS. 6A-6C) is a flow diagram depicting the steps of the method that are performed by a consumer products seller wishing to access the method and system of the present invention.
Figure 6B:
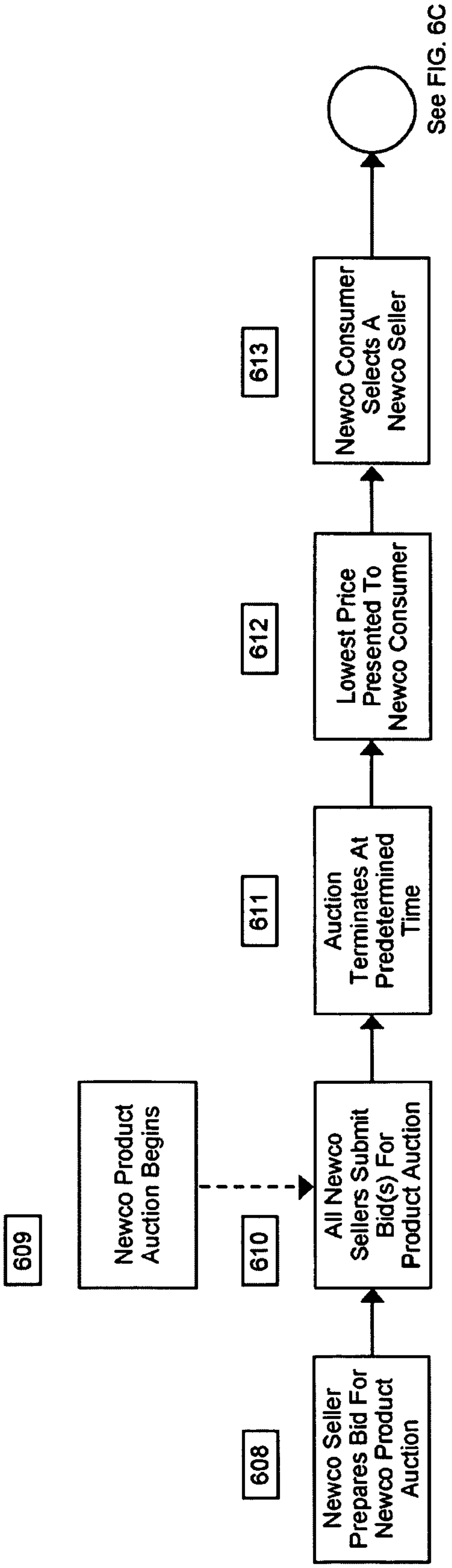
Figure 6C:
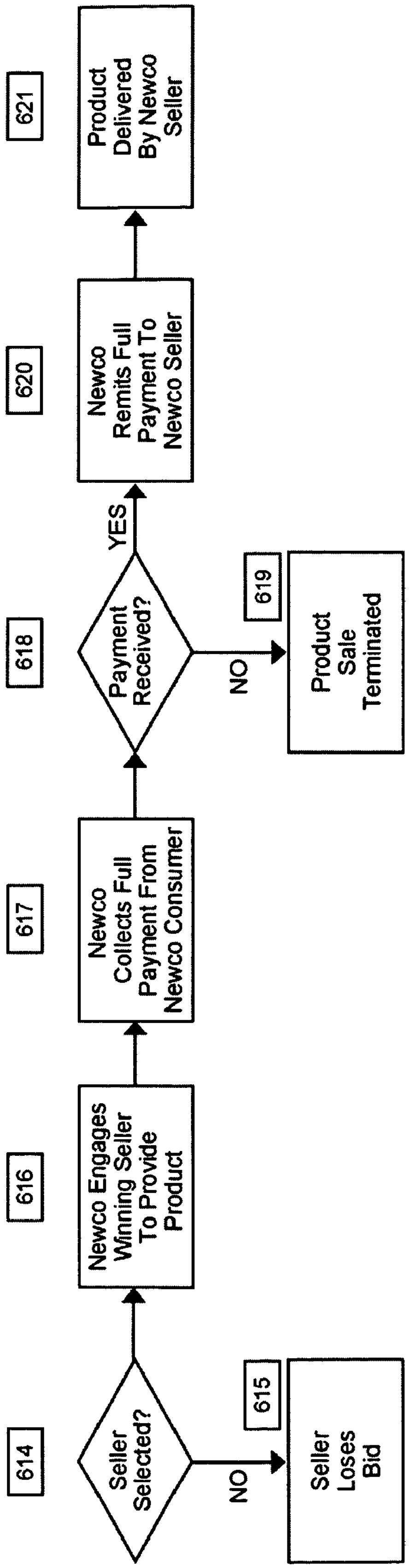

FIG. 6 (FIGS. 6A-6C) shows the process from the standpoint of the seller.

In step 601, a seller enters the market to sell a consumer product, for example, a non-custom, "big-ticket" item such a vehicle (automobile, truck, recreational vehicle, boat, etc.) appliance (kitchen or audio or visual) or any other type of high-value product.

In step 602, the seller logs into Newco's secure, private Web-Site on the World Wide Web through an Internet connection after being approved by Newco to participate in Newco Product Auctions. From this point forward the seller will be referred to as Newco Seller.

In step 603, Newco Seller accesses Newco's database of product applications from all consumers currently seeking products. From this point forward these consumers will be known as Newco Consumers.

Newco Seller accesses the following data on all current Newco Consumers: 1) The type of product desired, 2) The desired product features, and 3) Relevant personal information which will be used by prospective Sellers to evaluate the Consumer's ability to pay for the product and therefore be fully prepared to submit an accurate offer to provide the product. In a preferred embodiment, Newco Consumer's name is not disclosed. Only the zip code of Newco Consumer's address is disclosed.

In step 604, Newco Seller may filter all the product Applications using a custom interface which will sort the applications based upon specified parameters (product type, product features, Zip Code, and applicable asset information) and then segregate those products applications which meet each of Newco Seller's selling criteria.

Alternatively, in step 605, Newco Seller may filter all the product Applications using Web-based sorting tools, which will sort the applications based upon specified parameters (product type, product features, Zip Code, and applicable asset information) and then segregate those product applications that meet each of Newco Seller's selling criteria.

Newco Sellers will have access to all Newco Consumers and will have the choice of using a custom interface or Newco's Web-based filtering software.

In step 606 Newco Seller reviews product application to determine if it meets Newco Seller's criteria. If the application does not meet Newco Seller's criteria, in step 607, Newco Seller does not bid on the product application. If the application does meet Newco Seller's criteria, in step 608 Newco Seller prepares its bid(s) for the Newco Product Auction. At the same time, all other Newco Seller prepares their bid(s) for the Newco Product Auction.

In step 609, the Newco Product Auctions begins at its established time.

In step 610, Newco Sellers interested in providing product to this particular Newco Consumer submit their first bid to the Newco Product Auction, which is conducted over the Internet on the Newco Web-site in as close to real time as technologically possible. Bids may be submitted manually, or by using Newco's automated bidding tools, or by using a custom interface. In a preferred embodiment, the bid will contain one or more defined variables, such as price and/or other product costs. In a more preferred embodiment, the bid will contain one variable, such as price.

Using Web 2.0 related technologies, all bids submitted by all Newco Sellers are displayed confidentially to the Newco Consumer on the password-protected, secure portion of the public web-site. The bids are displayed in as close to real time as technologically possible. This product auction is displayed only to this particular Newco Consumer and not all Newco Consumers currently conducting their own Newco Product Auctions. As the Newco Sellers' bids are displayed to the Newco Consumer on his website, all of the Newco Sellers' bids will be simultaneously displayed in as close to real time as technologically possible to all bidding Newco Sellers. The Newco Product Auction process will trigger competition as a result of the full disclosure of competitive bids.

After reviewing competing loan bids, each Newco Seller participating in a particular Newco Product Auction will decide whether to submit new, lower bid(s). All Newco Sellers interested in submitting a new, lower bid may then submit a new, lower bid, which, in turn, is displayed to the Newco Consumer and all bidding Newco Sellers. Newco Sellers may also decide not to submit a new lower bid and stop bidding. The process will repeat until the auction terminates.

In step 611, Newco Product Auction terminates at the predetermined time. All final bids must be submitted prior to the auction termination.

In step 612, the lowest product price and product costs, if applicable, are displayed to Newco Consumer. In a preferred embodiment, the name or names of the bidders are not displayed to Newco Consumer.

In step 613, Newco Consumer selects a Newco Seller.

In step 614, it is determined whether a particular Newco Seller was selected by Newco Consumer.

In step 615, if Newco Consumer does not select a particular Newco Seller that Newco Seller loses the opportunity to provide the product to this Newco Consumer.

In step 616, if Newco Consumer selects a particular Newco Seller, that Newco Seller wins the bid. Newco engages this Newco Seller to provide the product to this Newco Consumer.

In step 617, Newco collects payment in full from Newco Consumer.

In step 618, if payment cannot be collected from Newco Consumer, the Product purchase is terminated. Otherwise, in step 620, Newco remits payment in full to Seller.

In step 620, Product delivered to Newco Consumer by Newco Seller.

FIG. 7 (FIGS. 7A-7F) depicts the method for a non-mortgage loan product.

As shown in FIG. 7 (FIGS. 7A-7F), in step 701, a consumer enters the market for loan to purchase a home, refinance an existing home mortgage loan, obtain a Home Equity Loan or Line of Credit, an automobile loan, a boat loan, or any other form of consumer-based loan.

In step 702, the consumer visits Newco's secure, public Web-Site on the World Wide Web through an Internet connection.

In step 703, the consumer reviews all pertinent data published on the web-site regarding method of operations and costs and decides whether to continue with the Newco loan process.

In step 704, if the consumer determines the Newco loan process does not meet his needs, the consumer may terminate the process without cost or obligation.

If the consumer determines the Newco loan process does meet his needs, the consumer continues with the Newco loan application process. From this point forward the loan applicant is referred to as a "Newco Consumer."

In step 705, Newco Consumer submits one or more transaction requirements in one or more established transaction parameters. For example, Newco Consumer submits the following data via the interne through a password-protected, secure, private connection: 1) The type of loan desired and amount of loan points to pay, if any 2) The desired term (in years) of the loan, 3) Personal credit information, and 4) Other relevant personal information and applicable collateral information which will be used by prospective lenders to evaluate the creditworthiness of the loan applicant and therefore be fully prepared to submit an accurate offer to provide the loan financing. In a preferred embodiment, Newco Consumer's name is not disclosed to prospective lenders. Only the zip code of Newco Consumer's address is disclosed.

Newco Consumer is also prompted to select an auction period within a set of established parameters. The Newco Loan Auction will automatically commence and terminate at the selected times.

In step 706, Newco Consumer completes the loan application. Newco Consumer attests that the data being submitted is accurate and correct and holds Newco and the Lender harmless in the event the data submitted is inaccurate. The Newco web-site verifies accuracy and completeness of the application.

If Newco computer reviews the data and determines an error has been made, in step 707, Newco Consumer is prompted to correct the submission.

After Newco Consumer submits accurate and correct data, in step 708, Newco stores the submitted data.

In step 709, Newco Consumer loan application data transmitted to Newco private web-site which may only be accessed by approved lenders who have been authorized to submit loan financing offers to Newco Consumers. From this point forward these approved lenders are referred to as "Newco Lenders."

In step 710, Newco computer determines the type of loan sought by Newco Consumer. If it is determined to be a consumer mortgage, then the process described above with respect to FIG. 1 (FIGS. 1A-1F) is followed. If it is determined to be a loan other than a consumer mortgage, then the process in this flow chart is followed.

As discussed above with respect to FIG. 2 (FIGS. 2A-2C), approved Newco Lenders may sort or filter pending Newco loan applications and determine which applications to bid on and which applications to not bid on.

In step 711, at the time predetermined by Newco consumer, the Newco Loan Auction begins.

In step 712, all Newco Lenders interested in providing loan financing to this particular Newco Consumer submit their first bid. In a preferred embodiment, the bid will contain one or more defined variables, such as interest rate and/or other loan costs. In a more preferred embodiment, the bid will contain one variable, such as interest rate.

In step 713, using Web 2.0 related technologies, all bids submitted by all Newco Lenders are displayed confidentially to the Newco Consumer on the password-protected, secure portion of the public web-site. The bids are displayed in as close to real time as technologically possible. This Loan Auction is displayed only to this particular Newco Consumer and not all Newco Consumers currently conducting their own Newco Loan Auctions.

As the Newco Lenders' bids are displayed to the Newco Consumer on his website, all of the Newco Lenders' bids will be simultaneously displayed in as close to real time as technologically possible to all bidding Newco Lenders. The Newco Loan Auction process will trigger competition as a result of the full disclosure of competitive bids.

After reviewing competing loan bids, in step 714, each Newco Lender participating in a particular Newco Loan Auction will decide whether to submit a new, lower bid. All Newco Lenders interested in submitting a new, lower bid may then submit a new, lower bid, which, in turn, is displayed to the Newco Consumer and all bidding Newco Lenders. Newco Lender may also decide not to submit a new lower bid and, in step 715, stop bidding. The bidding process continues until the end of the auction at the time predetermined by Newco Consumer. The offering of both first and subsequent bids may be done automatically by a computer or manually by an operator observing the progress of the process.

In step 716, the Newco Loan Auction terminates at the predetermined time. All final bids must be submitted prior to the auction termination.

In step 717, the lowest loan rate or rates and loan costs (points), if applicable, are displayed to the Newco Consumer. The name or names of the bidders are NOT displayed to the Newco Consumer.

In step 718, Newco Consumer decides whether the lowest rate or rates and loan costs, if applicable, presented are acceptable. If Newco Consumer determines that the rate or rates and loan costs, if applicable, presented are unacceptable, Newco Consumer can terminate the process in step 719.

Alternatively, if Newco Consumer determines that the rate or rates and loan points, if applicable, presented are acceptable, in step 720, Newco Consumer may execute an agreement with Newco. Newco Consumer executes an agreement electronically to have Newco procure all loan services on the consumer's behalf. Newco Consumer pays Newco a fee via a credit card over the internet.

In step 721, once Newco Consumer has executed the agreement and paid the fee, Newco displays the names of the multiple, identical low bidders. Alternatively, in step 722, once Newco Consumer has executed the agreement and paid the fee, Newco displays the name of the single low bidder. In another alternative embodiment, in step 723, once Newco Consumer has executed the agreement and paid the fee, Newco displays the names of all bidders.

In step 724M, if there are multiple identical lowest bidders, then Newco Consumer evaluates the names of the low bidders and decides which one to accept based upon any brand loyalties or brand aversions. Newco Consumer may select one of the multiple identical lowest bidders, or, if the lowest bidders are unacceptable to Newco Consumer, Newco may give Newco Consumer the option to view the name(s) of the next lowest bidder(s).

In step 725M, the name(s) of the next lowest bidder(s) are presented to Newco Consumer.

In step 726M, Newco Consumer evaluates the next lowest bidder(s) and determines if the bidder(s) is/are acceptable based upon any brand loyalty or brand aversion. Newco Consumer may select a bidder, or, if the next lowest bidder(s) are unacceptable to Newco Consumer, Newco may give Newco Consumer the option to view the names of the next lowest bidder(s), or Newco may give Newco Consumer the option to return to any of the previously displayed bidders.

In step 727M, the name(s) of the next lowest bidder(s) are presented to Newco Consumer.

In step 728M, Newco Consumer evaluates the next lowest bidder(s) and determines if the bidder(s) is/are acceptable based upon any brand loyalty or brand aversion. Newco Consumer may select a bidder, or, if the next lowest bidder(s) are unacceptable to Newco Consumer, Newco may give Newco Consumer the option to view the names of the next lowest bidder(s), or Newco may give Newco Consumer the option to return to any of the previously displayed bidders.

Alternatively, in step 724S, if there is one single lowest bid, Newco Consumer evaluates the lowest bidder and determines if that lowest bidder is acceptable based upon any brand loyalty or brand aversion. Newco Consumer may select the lowest bidder, or, if the single lowest bidder is unacceptable to Newco Consumer, Newco may give Newco Consumer the option to view the name of the 2nd lowest bidder.

In step 725S, the name of the 2nd lowest bidder is presented to Newco Consumer.

In step 726S, Newco Consumer evaluates the 2nd lowest bidder and determines if this bidder is acceptable based upon any brand loyalty or brand aversion. Newco Consumer may select the 2nd lowest bidder, or, if the 2nd lowest bidder is unacceptable to Newco Consumer, Newco may give Newco Consumer the option to view the name of the 3rd lowest bidder, or Newco may give Newco Consumer the option to return to the 1st lowest bidder.

In step 727S, the name of the 3rd lowest bidder is presented to Newco Consumer.

In step 728S, Newco Consumer evaluates the 3rd lowest bidder and determines if this bidder is acceptable based upon any brand loyalty or brand aversion. Newco Consumer may select the 3rd lowest bidder, or, if the 3rd lowest bidder is unacceptable to Newco Consumer, Newco may give Newco Consumer the option to view the name of the 4th lowest bidder (and cycle repeats through 5th, 6th, etc lowest bidder), or, Newco may give Newco Consumer the option to return to the 2nd lowest or 1st lowest bidder.

It will be recognized that the steps may be repeated presenting subsequent bid(s) until the consumer selects a bidder. In each instance, the consumer may select a previously displayed bid which the consumer originally rejected. It will be also be recognized that these steps may be intermingled. In one example, the process may result in a single lowest bid for the consumer to consider (Step 725S) followed by multiple next lowest bids to consider (Step 727M).

Figure 7A:
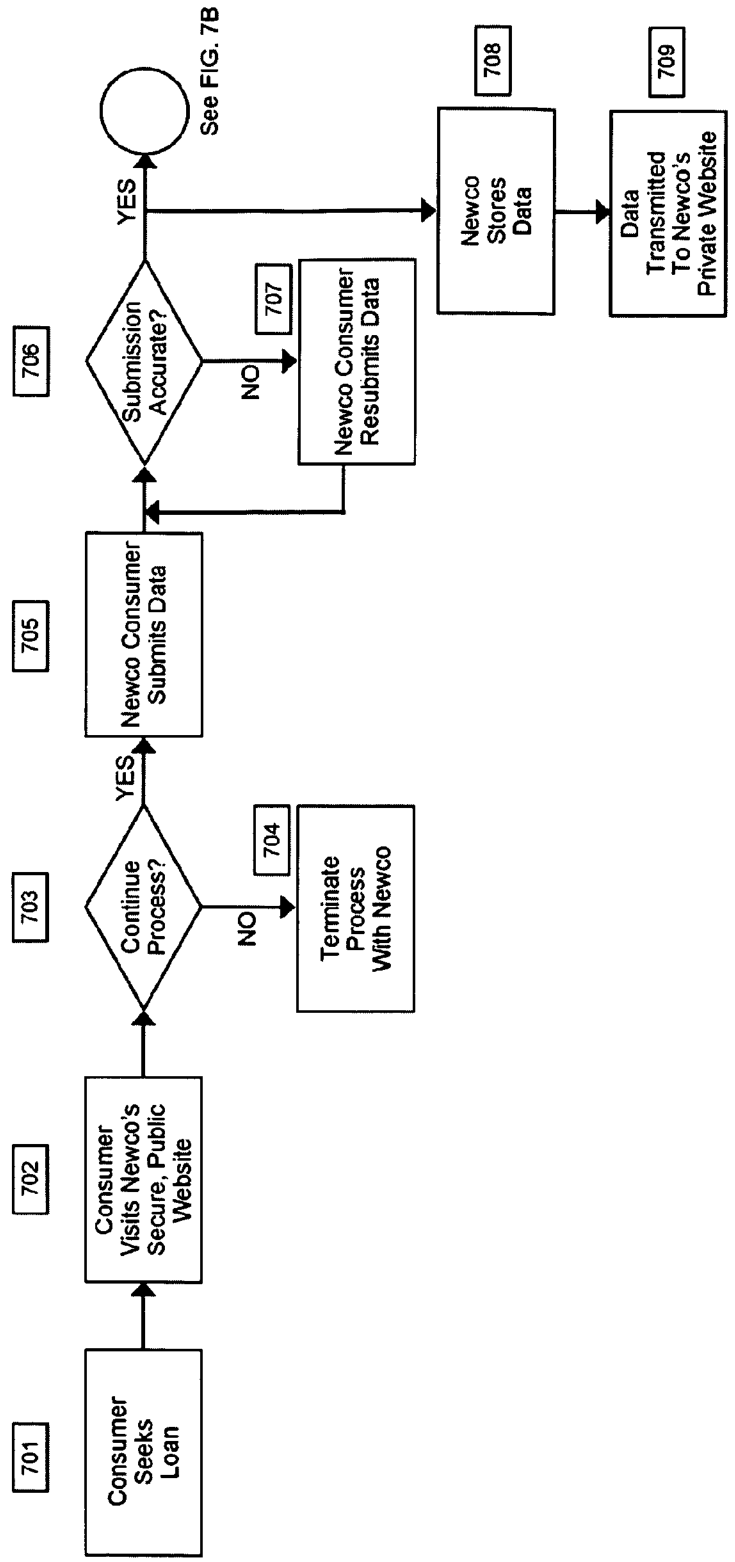
FIG. 7 (FIGS. 7A-7F) is a flow diagram depicting the steps of the method performed by a non-mortgage loan consumer wishing to access the method and system of the present invention.
Figure 7B:
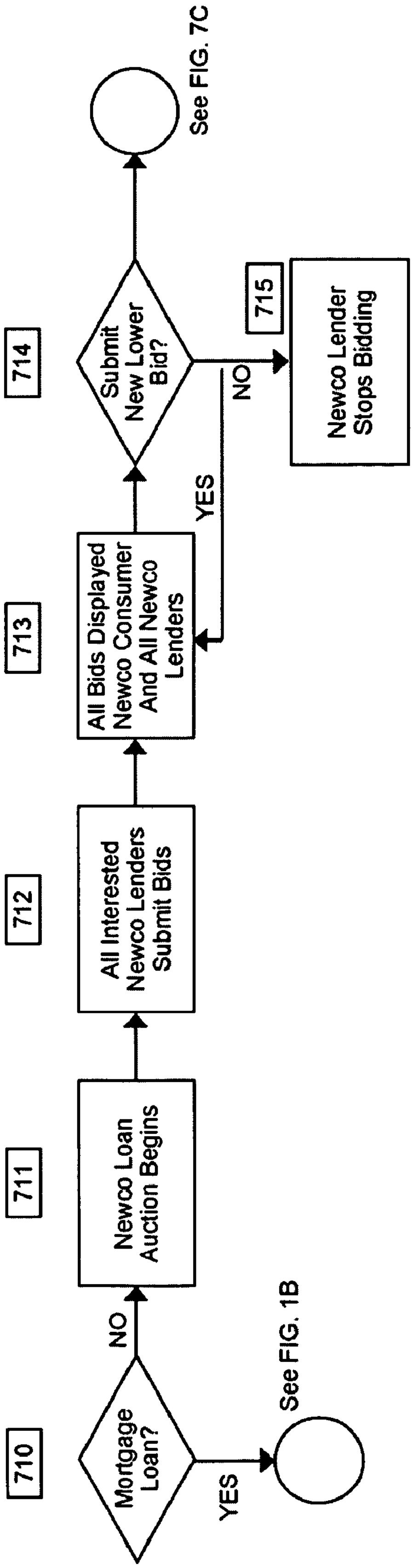
Figure 7C:
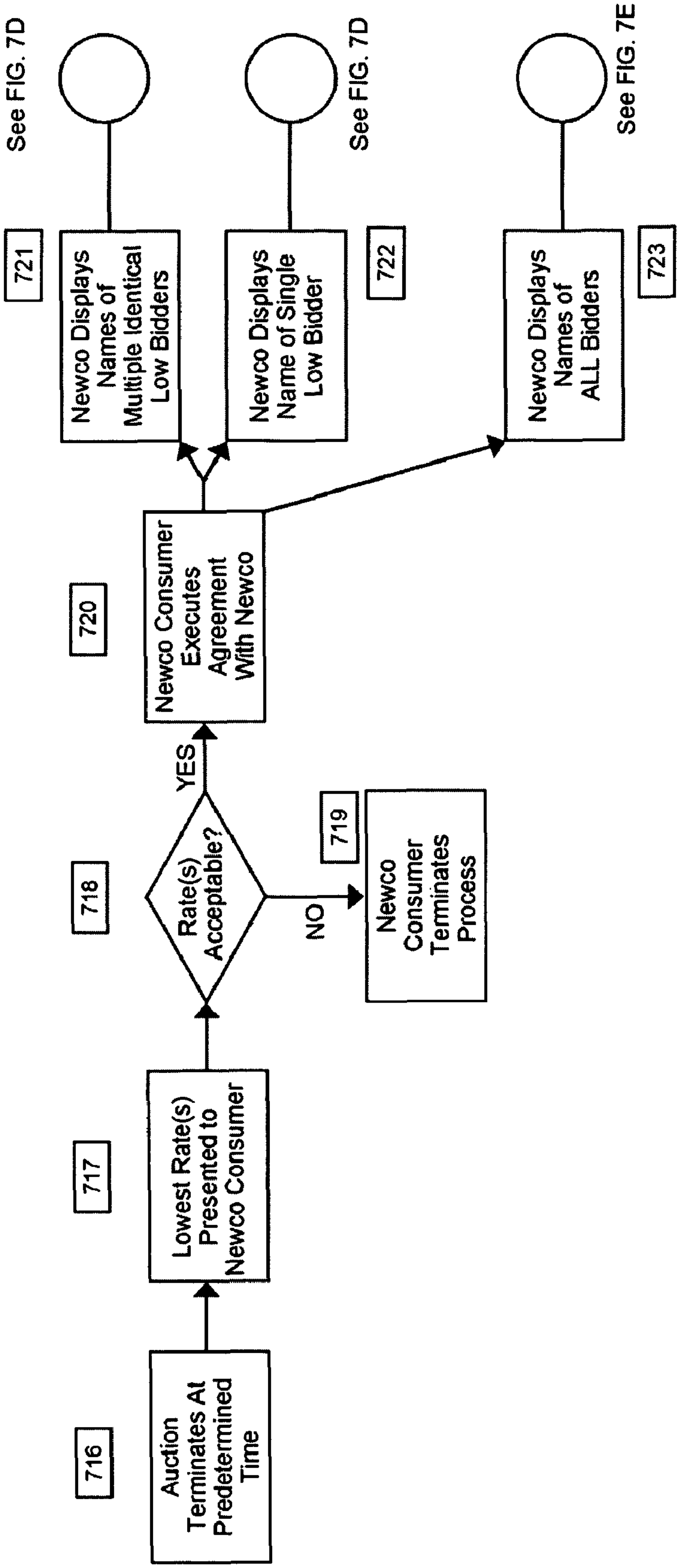
Figure 7D:
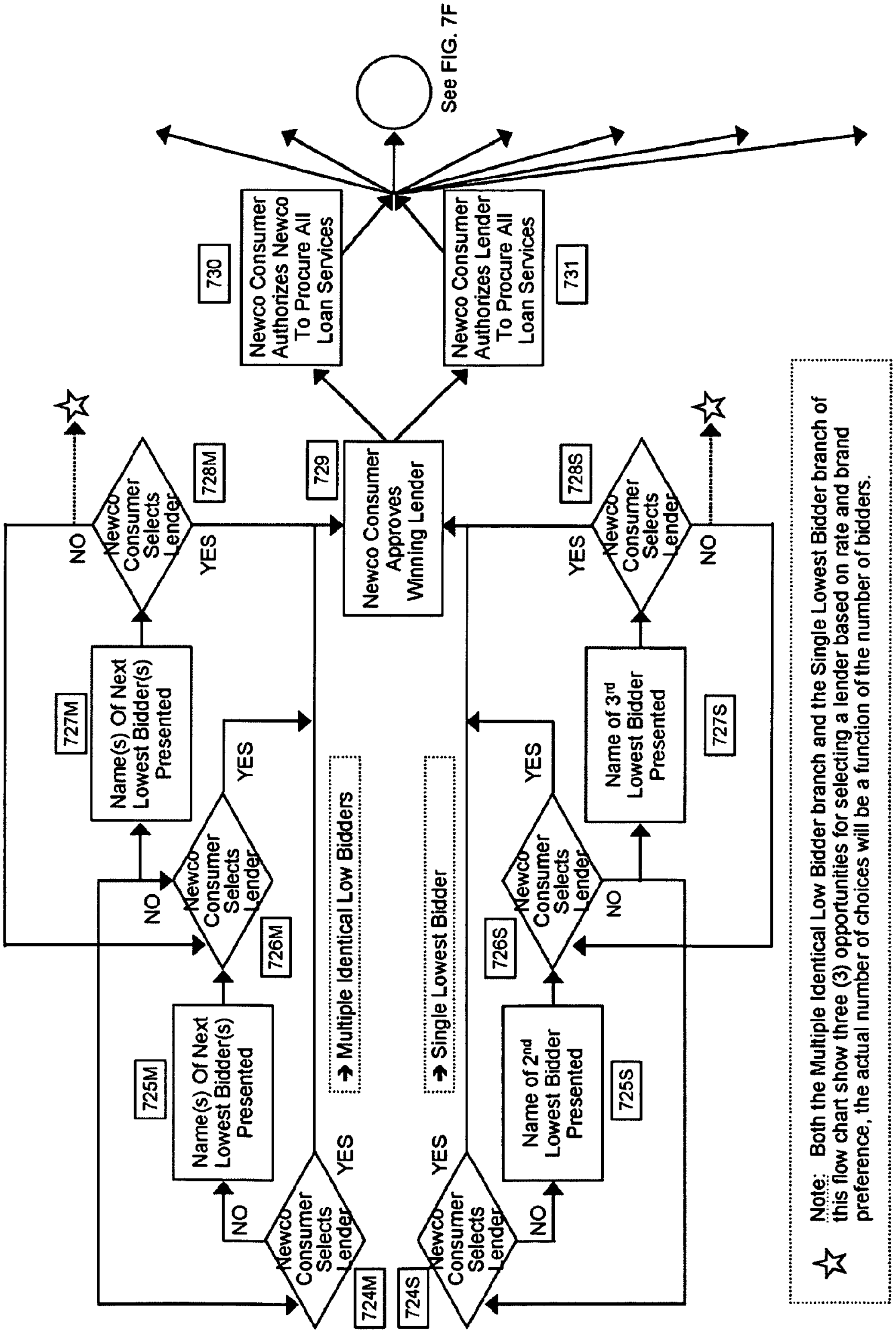
Figure 7E:
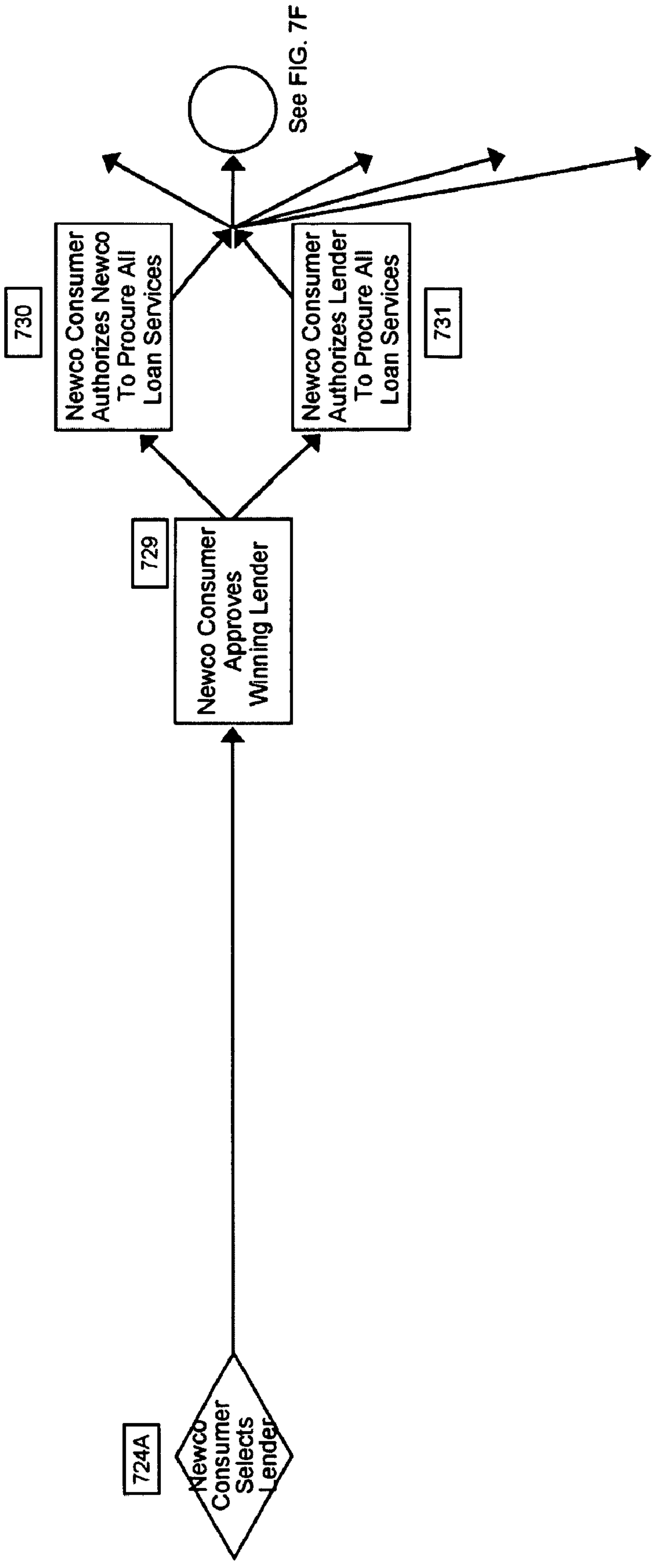
Figure 7F:
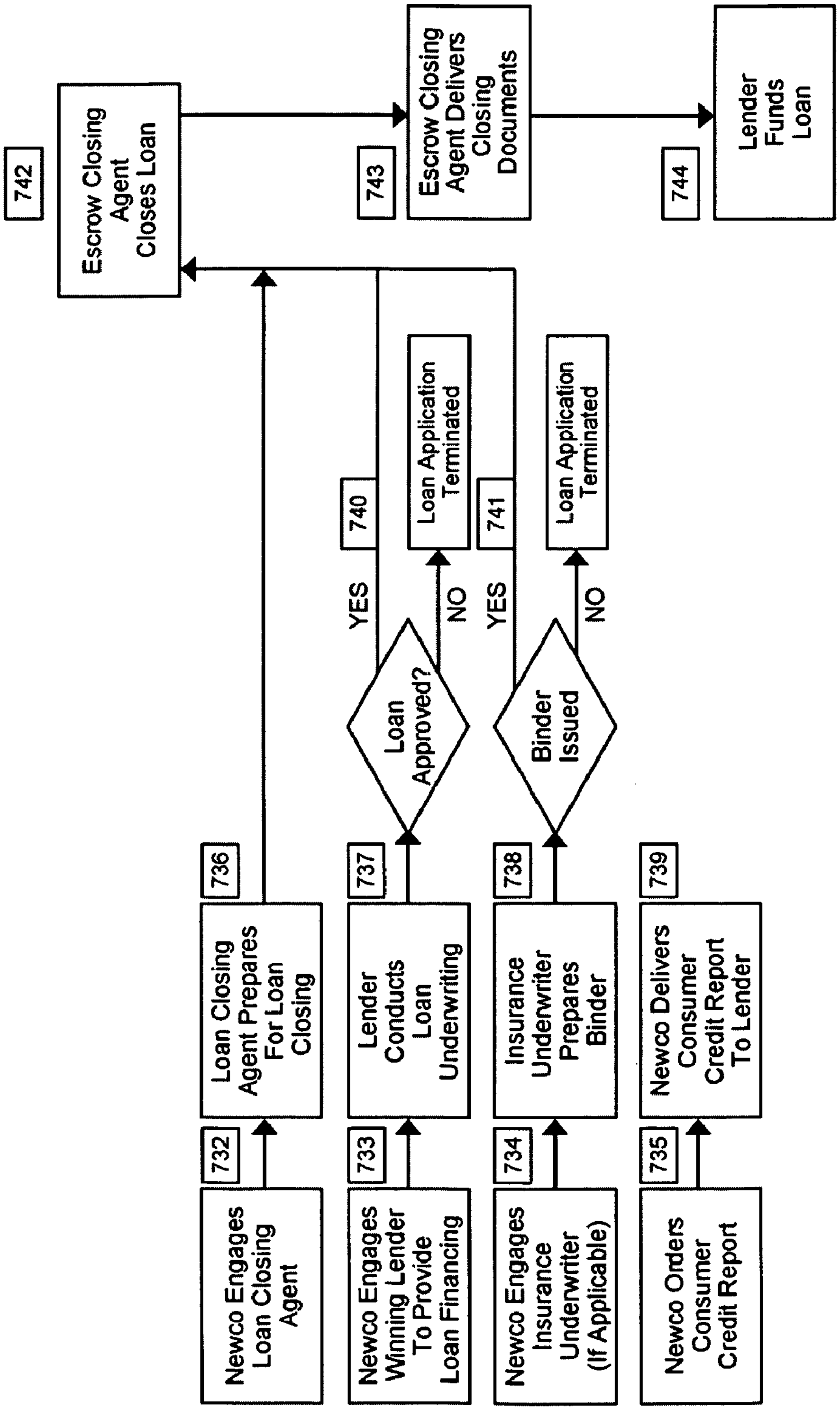

In another alternate embodiment, as shown in FIG. 7E, if in step 723 Newco displays the names of all bidders, then in step 724A Newco Consumer selects a Lender.

Once Newco Consumer has selected a lender, by one of the above procedures, in step 729, Newco Consumer approves the winning lender by electronic confirmation.

After the consumer selects and approves a bidder, in step 730, the consumer may engage Newco to procure all necessary loan services on his behalf in order to close the loan, or in step 731 Newco Consumer executes an electronic agreement with the selected Lender to procure all necessary loan services on behalf of the Newco Consumer in order to close the loan.

In a preferred embodiment, Newco Consumer can electronically access through the web-site the progress and status of his loan application 24 hours per day, 7 days per week in as close to real time as technologically possible.

In step 732, Newco engages Loan Closing Agent to close loan. In step 736, Loan Closing Agent prepares for loan closing.

In step 733, Newco engages Lender to provide loan financing. In step 737 Lender conducts loan underwriting. If the Lender does not approve the loan request by issuing a commitment to lend, in step 740 the Loan Application is terminated.

In step 734, Newco engages Insurance Company to provide insurance (if required for this type of loan). In step 738 Insurance Company prepares insurance binder. If the Insurance Company does not issue an insurance binder, in step 741 the Loan Application is terminated.

In step 735, Newco orders consumer credit report. In step 739 Newco delivers consumer credit report to Lender.

In step 742, Loan Closing Agent coordinates all closing activities and closes the loan.

In step 743, Loan Closing Agent delivers closing documents to all appropriate parties In step 744, Lender funds loan and Loan Closing Agent disburses funds.

The present invention also includes a system for the operation of the method. In a preferred embodiment, an company maintains a web site which includes 1) public web pages ("public page" or "public pages"), 2) private, secure web pages accessible only by consumers registered with the system ("consumer page" or "consumer pages"), and 3) private, secure web pages accessible only by approved potential sellers ("seller page" or "seller pages"), and 4) at least one bid display page. The bid display page may be a common page accessed by both the consumer and one or more of the potential sellers or separate bid display pages may be provided for each of the consumer and potential sellers. A consumer submits transaction requirements within established parameters to the consumer page or pages. A seller submits transaction requirements within established parameters to the seller page or pages. Through the seller page or pages, potential sellers may filter or compare the transaction requirements submitted by the consumer against the seller's transaction requirements.

Through the seller page or pages, potential sellers may submit bids in the form of a price. Also, through the consumer page or pages, the consumer may view the progress of the bidding. Preferably, the bids will be displayed in as close to real time as possible to both the consumer and the potential sellers. It will be recognized by those skilled in the art that the seller page or pages and consumer page or pages may be separate web pages or one or more commonly accessed web pages.

The system also includes a filter which may be used by potential sellers to automatically remove or screen transaction requirements which are not of interest to the potential seller. The filter allows a potential seller to filter or compare the transaction requirements submitted by the consumer against the seller's transaction requirements.

For example, the filter may be used to remove or retain certain zip codes, income levels, consumer credit ratings, or types of tangible and/or intangible products. Persons of skill in the art will recognize that these are examples of transaction requirements which may be screened by the filter and are not intended to be limited to the examples named above.

In one embodiment, the company may provide a filter or filtering program to the approved potential sellers. The filter supplied by the company may possess a generic set of parameters used to screen transaction requirements. In a preferred embodiment, one or more of the approved potential sellers may supply additional specific parameters to the company's filter to screen transaction requirements. In an alternate embodiment, one or more approved potential sellers may provide a filter or filtering program to the company. It will be recognized by those having skill in the art that the web site may simultaneously support a plurality of filters each having different parameters and transaction requirements, and that theses filters may be supplied by approved potential sellers, the company, or third-parties.

In a preferred alternate embodiment, the company's web site will employ Web 2.0 technologies, or their equivalents or other technologies known to those skilled in the art, to enable the company and potential sellers to automatically update the site with parameters and transaction requirements. Thus, for example, using Web 2.0 technologies, a potential seller may update its supplied filter to add new targeted zip codes, change approved income levels, alter approval ranges for credit scores, and effect other changes in the filter.

Persons of skill in the art will recognize that the system and method of the present invention may be implemented by a series of computers and accompanying networking systems operated by one or more parties. Thus, by means of the Internet, each consumer may access the company's public page or pages through his or her own computer or network. Similarly, one or more potential sellers may also access the company's public or seller page or pages through their own network via the Internet. Examples of such networks can be seen in U.S. Pat. Nos. 6,385,594 both to Lebda, et al. and in U.S. Patent Publication Nos. 2004/0030639 and 2005/0273406 both to Lebda, et al. which are hereby incorporated by reference in their entirety.

It will also be seen that a consumer may access the system through alternate means such as by a telephone connection with either a computer or human operator that will input the consumer's transaction requirements. Thus, the system provides a consumer transaction requirement medium to be used for submitting the consumer's transaction requirements. The medium may be one or more of a publicly accessible web page, a private transaction requirements submission page, a telephone, or other suitable communication medium.

In accordance with an embodiment of the invention, communication of information between the various components of the present invention is accomplished over a network consisting of electronic devices connected either physically or wirelessly, wherein digital information is transmitted from one device to another. Such devices may include, but are not limited to, a desktop computer, a laptop computer, a handheld device or PDA, a telephone, a set top box, an Internet appliance, or the like. Exemplary networks include a Local Area Network, a Wide Area Network, an organizational intranet, the Internet, or the like. The functionality of an exemplary computer and network are further explained in conjunction with FIG. 8, below.

The present invention may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 8:
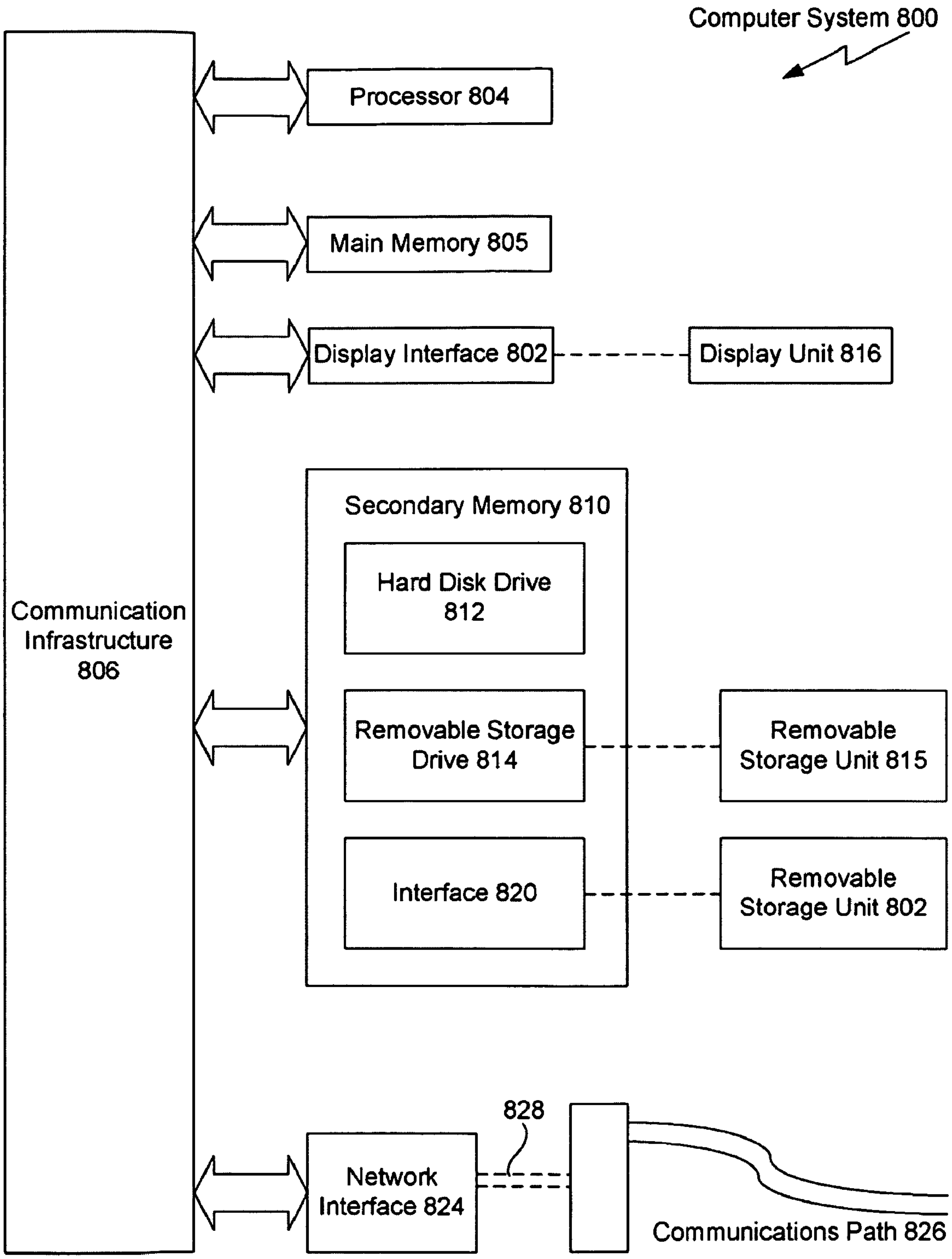
FIG. 8 is a block diagram of a computer system on which the present invention can be implemented.

In fact, in one embodiment, the invention is directed toward one or more computer systems capable of carrying out the functionality described herein. An example of a computer system 800 is shown in FIG. 8.

Computer system 800 includes one or more processors, such as processor 804. Processor 804 is connected to a communication infrastructure 806 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 800 can include a display interface 802 that forwards graphics, text, and other data from communication infrastructure 806 (or from a frame buffer not shown) for display on display unit 816.

Computer system 800 also includes a main memory 805, preferably random access memory (RAM), and may also include a secondary memory 810. Secondary memory 810 may include, for example, a hard disk drive 812 and/or a removable storage drive 814, representing a floppy disk drive, a magnetic tape drive, an optical disk drive, etc. Removable storage drive 814 reads from and/or writes to a removable storage unit 815 in a well known manner. Removable storage unit 815 represents a floppy disk, magnetic tape, optical disk, etc. which is read by and written to by removable storage drive 814. As will be appreciated, removable storage unit 815 includes a computer usable storage medium having stored therein computer software and/or data.

In alternative embodiments, secondary memory 810 may include other similar devices for allowing computer programs or other instructions to be loaded into computer system 800. Such devices may include, for example, a removable storage unit 802 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 802 and interfaces 820, which allow software and data to be transferred from removable storage unit 802 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical or other signals capable of being received by communications interface 824. These signals 828 are provided to communications interface 824 via a communications path (e.g., channel) 826. This channel 826 carries signals 828 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 814, a hard disk installed in hard disk drive 812, and signals 828. These computer program products provide software to computer system 800. The invention is directed to such computer program products.

Computer programs (also referred to as computer control logic) are stored in main memory 805 and/or secondary memory 810. Computer programs may also be received via communications interface 824. Such computer programs, when executed, enable computer system 800 to perform the features of the present invention, as discussed herein. In particular, the computer programs, when executed, enable processor 804 to perform the features of the present invention. Accordingly, such computer programs represent controllers of computer system 800.

In an embodiment where the invention is implemented using software, the software may be stored in a computer program product and loaded into computer system 800 using removable storage drive 814, hard drive 812 or communications interface 824. The control logic (software), when executed by processor 804, causes processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Thus, it is seen that the objects of the present invention are efficiently obtained, and, although modifications and changes to the invention may be readily apparent to those having ordinary skill in the art, it should be appreciated that such modifications are intended to be within the spirit and scope of the invention as claimed.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer implemented method for administering a sales transaction, comprising:

a. receiving from one or more potential consumers a request for bids for said sales transaction and one or more consumer transaction requirements for said sales transaction within one or more established transaction parameters;

b. storing said request for bids for said sales transaction and said one or more consumer transaction requirements in an electronic database;

c. receiving from one or more potential sellers one or more seller transaction requirements within said one or more established transaction parameters;

d. filtering, by a computer, said one or more stored consumer transaction requirements based on said one or more seller transaction requirements and producing, by the computer, a subset of potential sellers based on said filtering;

e. displaying said request for bids and said stored consumer transaction requirements to said subset of potential sellers;

f. receiving from one or more of said subset of potential sellers a bid for said sales transaction in response to said request for bids and a corresponding identification of said potential seller, wherein said bid is limited to a predefined number and type of variables;

g. displaying said bid to said subset of potential sellers;

h. receiving from one or more of said subset of potential sellers one or more subsequent bids for said sales transaction;

i. displaying one or more of said bids and said corresponding potential seller identification to one or more of said potential consumers to enable said one or more of said potential consumers to consider any loyalties or aversions to said potential sellers; and j. receiving from said one or more of said potential consumers an acceptance or rejection of one or more of said displayed bids.

2. The method of claim 1, wherein said filtering step comprises filtering said one or more stored consumer transaction requirements based on said one or more seller transaction requirements according to a filtering algorithm.

3. The method of claim 2, further comprising receiving from one or more of said potential sellers a selection of said filtering algorithm from one or more predefined filtering algorithms.

4. The method of claim 2, further comprising receiving from one or more of said potential sellers said filtering algorithm.

5. The method of claim 2, wherein said filtering algorithm comprises comparing one or more of said seller transaction requirements within said one or more established transaction parameters to one or more of said consumer transaction requirements within said one or more established transaction parameters.

6. The method of claim 1, wherein said displaying one or more of said bids and said corresponding potential seller identification to one or more of said potential consumers comprises:

displaying one or more of said bids to one or more of said potential consumers without displaying the corresponding potential seller identification receiving from said one or more of said potential consumers an agreement to proceed with the sales transaction; and only after receiving said agreement, displaying the corresponding potential seller identification for said displayed bids to said one or more of said one or more potential consumers.

* * * * *